US009031352B2

(12) United States Patent
Tay

(10) Patent No.: US 9,031,352 B2
(45) Date of Patent: *May 12, 2015

(54) AUTO-FOCUS IMAGE SYSTEM

(76) Inventor: Hiok Nam Tay, Singapore (SG)

(*) Notice: Subject to any disclaimer, the term of this patent is extended or adjusted under 35 U.S.C. 154(b) by 162 days.

This patent is subject to a terminal disclaimer.

(21) Appl. No.: 13/112,212

(22) Filed: Sep. 26, 2011

(65) Prior Publication Data

US 2012/0008872 A1 Jan. 12, 2012

Related U.S. Application Data

(63) Continuation-in-part of application No. 12/626,840, filed on Nov. 27, 2009, now Pat. No. 8,462,258, which is a continuation-in-part of application No. PCT/IB2010/052375, filed on May 27, 2010.

(60) Provisional application No. 61/172,179, filed on Apr. 23, 2009, provisional application No. 61/118,203, filed on Nov. 26, 2008, provisional application No. 61/348,699, filed on May 26, 2010.

(30) Foreign Application Priority Data

May 27, 2010 (JP) ................................. 2010-122100

(51) Int. Cl.
G06K 9/40 (2006.01)
G02B 7/36 (2006.01)
G03B 3/10 (2006.01)
G03B 13/36 (2006.01)
H04N 5/232 (2006.01)

(52) U.S. Cl.
CPC .... *G02B 7/36* (2013.01); *G02B 7/365* (2013.01); *G03B 3/10* (2013.01); *G03B 13/36* (2013.01); *H04N 5/23212* (2013.01); *H04N 5/23293* (2013.01)

(58) Field of Classification Search
USPC ................ 382/255, 266, 199; 348/222.1, 345
See application file for complete search history.

(56) References Cited

U.S. PATENT DOCUMENTS 4,652,931 A 3/1987 Okudaira et al.
4,694,151 A 9/1987 Yoshimura (Continued)

FOREIGN PATENT DOCUMENTS

EP 0552016 A2 7/1993
EP 0926526 A2 6/1999

(Continued)

OTHER PUBLICATIONS

PCT/IB2009/005357 International Search Report.

(Continued)

*Primary Examiner* — Yon Couso

(57) ABSTRACT

An auto focus image system that includes a pixel array coupled to a focus signal generator. The pixel array captures an image that has at least one edge. The focus signal generator may generate a focus signal that is a function of a width of the edge and/or statistics of widths of edges. A processor receives the focus signal and/or the statistics of the widths and adjusts a focus position of a focus lens. The width can be determined by various techniques including the use of gradients. An width determined along a prescribed direction is corrected for a slant of a boundary to which the edge belongs relative to the prescribed direction. The correction may use a peak gradient in the prescribed direction along the edge in conjunction with a largest gradient of a perpendicular direction within a predefined neighborhood of the peak gradient.

14 Claims, 31 Drawing Sheets

(56) References Cited

U.S. PATENT DOCUMENTS

| | | |
|---|---|---|
| 5,396,336 A | 3/1995 | Yoshii |
| 5,496,106 A | 3/1996 | Anderson |
| 5,729,290 A | 3/1998 | Tokumitsu |
| 5,790,710 A * | 8/1998 | Price et al. ............... 382/255 |
| 5,875,040 A | 2/1999 | Matraszek |
| 5,880,455 A | 3/1999 | Otaki et al. |
| 6,094,508 A | 7/2000 | Acharya |
| 6,337,925 B1 | 1/2002 | Cohen |
| 7,406,208 B2 | 7/2008 | Chiang |
| 7,586,520 B2 | 9/2009 | Igarashi |
| 7,590,288 B1 | 9/2009 | Alvarez |
| 7,668,389 B2 | 2/2010 | Kitamura |
| 7,720,302 B2 | 5/2010 | Aoyama |
| 7,899,264 B2 | 3/2011 | Stewart |
| 8,264,591 B2 * | 9/2012 | Yeo et al. ............... 348/345 |
| 8,462,258 B2 * | 6/2013 | Tay ............... 348/345 |
| 2002/0114015 A1 | 8/2002 | Fujii |
| 2003/0053161 A1 | 3/2003 | Li |
| 2003/0099044 A1 * | 5/2003 | Fujii ............... 359/698 |
| 2003/0158710 A1 | 8/2003 | Bowley, Jr. |
| 2004/0267506 A1 | 12/2004 | Bowley, Jr. |
| 2005/0189419 A1 | 9/2005 | Igarashi |
| 2005/0243351 A1 | 11/2005 | Aoyama |
| 2005/0244077 A1 | 11/2005 | Kitamura |
| 2005/0248655 A1 | 11/2005 | Kitamura |
| 2005/0249429 A1 | 11/2005 | Kitamura |
| 2006/0078217 A1 | 4/2006 | Poon |
| 2006/0078218 A1 | 4/2006 | Igarashi |
| 2006/0188170 A1 | 8/2006 | Kanda |
| 2006/0204120 A1 | 9/2006 | Poon |
| 2006/0290932 A1 | 12/2006 | Kawami |
| 2007/0206937 A1 | 9/2007 | Kusaka |
| 2007/0279696 A1 | 12/2007 | Matsuzaka |
| 2008/0021665 A1 | 1/2008 | Vaughnn |
| 2008/0036900 A1 * | 2/2008 | Nakajima et al. ............... 348/345 |
| 2008/0151309 A1 | 6/2008 | Mizobe |
| 2008/0219655 A1 | 9/2008 | Yoon et al. |
| 2008/0267508 A1 | 10/2008 | Steffensen |
| 2009/0102963 A1 * | 4/2009 | Yeo et al. ............... 348/349 |
| 2009/0160962 A1 | 6/2009 | Tabuchi et al. |
| 2009/0256927 A1 | 10/2009 | Komiya et al. |
| 2009/0278947 A1 | 11/2009 | Schultz |
| 2010/0033617 A1 | 2/2010 | Forutanpour |
| 2011/0134312 A1 | 6/2011 | Tay |

FOREIGN PATENT DOCUMENTS

| | | |
|---|---|---|
| GB | 2475983 A | 3/2013 |
| JP | 03-154576 A | 7/1991 |
| JP | 1998-099279 A | 4/1998 |
| JP | 2001-331806 A | 11/2001 |
| JP | 2002-214513 A | 7/2002 |
| JP | 2003-125198 A | 4/2003 |
| JP | 2003-262783 A | 9/2003 |
| JP | 2004-198715 A | 7/2004 |
| JP | 2009218806 A | 9/2009 |
| WO | 2009-063326 A | 5/2009 |
| WO | 2010/061250 A1 | 6/2010 |

OTHER PUBLICATIONS

PCT/IB2010/052375 International Search Report.
PCT/IB2009/055373 International Search Report.
PCT/IB2009/055373, Written Opinion of International Search Authority.
PCT/IB2009/005357, Written Opinion of International Search Authority.
PCT/IB2010/052375, Written Opinion of International Search Authority.

* cited by examiner

|    | C1      | C2       | C3       | C4      | C5      | C6      |
|----|---------|----------|----------|---------|---------|---------|
| R1 | 10 9 V  | 10 10 V  | 10 9 V   | 2 0     | 0 0     | 0 0     |
| R2 | 3 0     | 10 8 V   | 10 11 V  | 9 10 V  | 1 0     | 0 0     |
| R3 | 1 0     | 3 1      | 8 8 V    | 9 11 V  | 7 8 V   | 1 0     |
| R4 | 0 0     | 1 0      | 3 2      | 7 8 V   | 8 10 V  | 7 8 V   |
| R5 | 0 -2    | 0 0      | 1 1      | 3 3     | 7 12 H  | 6 12 H  |
| R6 | 0 -1    | 0 -1     | 0 0      | 1 2     | 3 0 V   | 1 8 H   |

$b = a \cos\phi$ corrects edge width for slant angle $\phi$

| | C1 | C2 | C3 | C4 | C5 | C6 |
|---|---|---|---|---|---|---|
| R1 | 0<br>6 H | 5<br>10 H | 1<br>3 | 2<br>0 | 0<br>0 | 0<br>0 |
| R2 | 3<br>0 | 8<br>8 H | 15<br>11 V | 19<br>10 V | 1<br>0 | 0<br>0 |
| R3 | 1<br>0 | 3<br>1 | 18<br>8 V | 19<br>11 V | 17<br>8 V | 1<br>0 |
| R4 | 0<br>0 | 1<br>0 | 3<br>2 | 17<br>8 V | 18<br>10 V | 7<br>3 H |
| R5 | 0<br>2 | 0<br>0 | 1<br>1 V | 3<br>3 | 7<br>12 H | 6<br>12 H |
| R6 | 0<br>1 | 0<br>1 | 0<br>0 | 1<br>2 | 3<br>0 | 1<br>8 H |

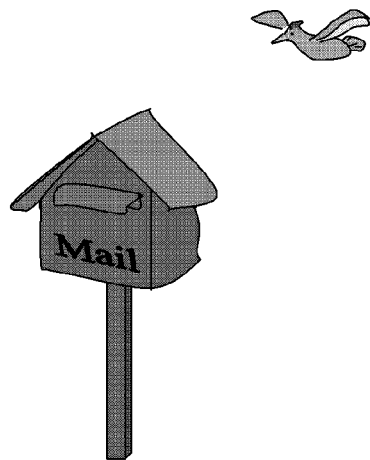
FIG. 42A  FIG. 42B
FIG. 42C

AUTO-FOCUS IMAGE SYSTEM

CROSS-REFERENCE TO RELATED APPLICATIONS

This patent application is a continuation-in-part of U.S. patent application Ser. No. 12/626,840 filed on Nov. 27, 2009, which claims priority to U.S. Provisional Patent Application No. 61/172,179 filed on Apr. 23, 2009 and U.S. Provisional Patent Application No. 61/118,203 filed on Nov. 26, 2008, and is a continuation-in-part of PCT Patent Application PCT/IB2010/052375 filed on May 27, 2010, which claims priority to U.S. Provisional Patent Application No. 61/348,699, filed May 26, 2010, and Japan Patent Application No. 2010-122100, filed May 27, 2010.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a focus position of a focus lens. There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto focus image system that includes a pixel array coupled to a focus signal generator. The pixel array captures an image that has at least one edge with a width. The generator generates a focus signal that is a function of the edge width and various statistics of edge width.

BRIEF DESCRIPTION OF THE DRAWINGS

FIG. 42A is an illustration showing a first image captured when a selection region selects a bird in a scene and the exclusion calibrator calibrates for the bird when in sharp focus.

FIG. 42B is an illustration showing a second image captured after the bird has moved to a second location of the image capture frame.

FIG. 42C is an illustration showing a third image captured after the bird has moved to a third location from the second location.

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. A processor receives the focus signal and/or the statistics of edge widths and adjust a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
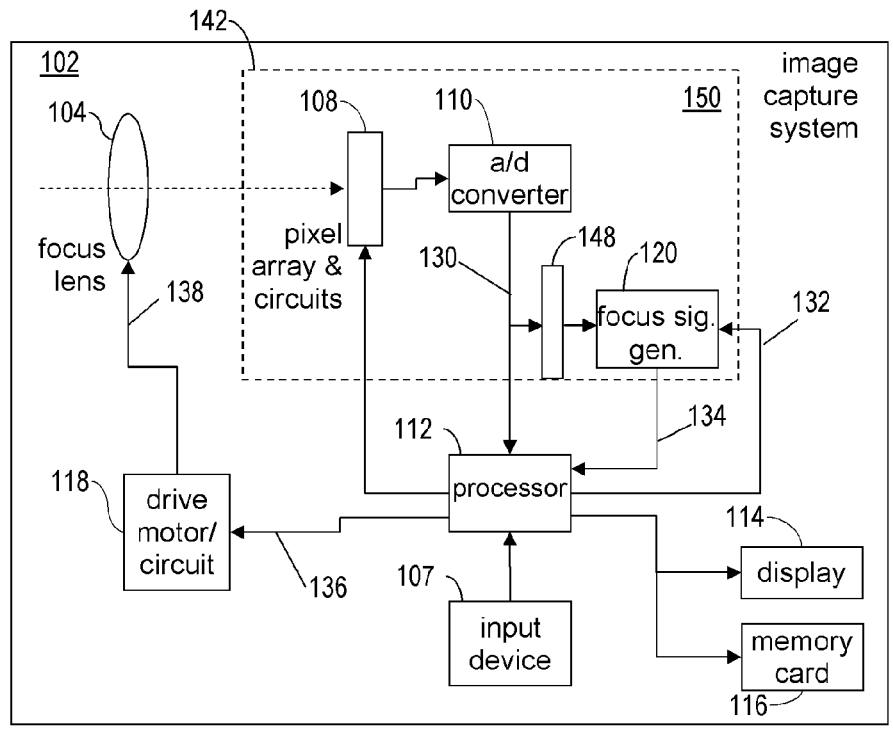
FIG. 1 is a schematic of an embodiment of an auto-focus image pickup apparatus
Figure 2:
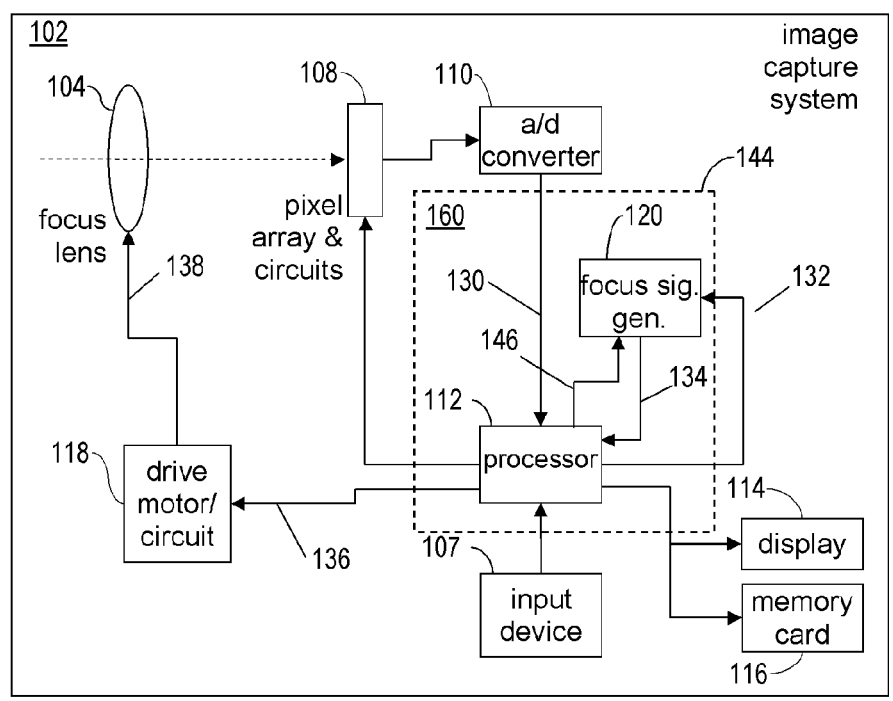
FIG. 2 is a schematic of an alternate embodiment of an auto-focus image pickup apparatus

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternately, the focus signal generator 120 and processor 112 may together reside within a package 144 as a camera controller 160 shown in FIG. 2, separate from the pixel array 108 and A/D Converter 110.

Focus Signal Generator

Figure 3:
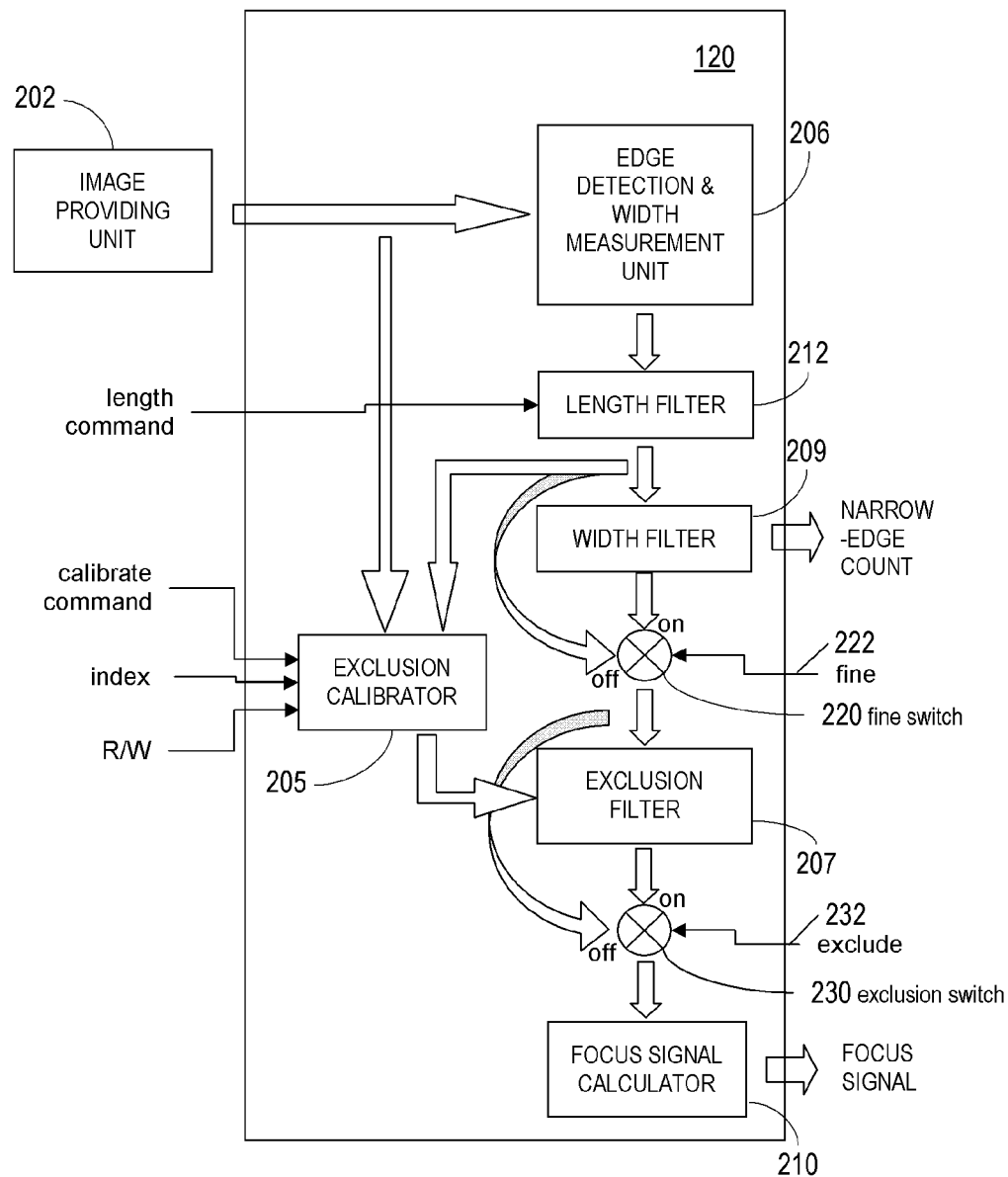
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, a width filter 209, an exclusion filter 207, and an exclusion calibrator 205. It may further comprise a fine switch 220 and an exclusion switch 230, controlled by inputs 'fine' 222 and 'exclude' 232, respectively. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. The exclusion calibrator 205 receives command and control signals (calibrate command, index, and R/W) input to the focus signal generator 120. In the context of FIGS. 1 and 2, these command and control signals, along with control signal 'fine' 222 and 'exclude' 232, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation $Y=0.2126*R+0.7152*G+0.0722*B$, where Y is luminance value. The single image signal may then be processed by a Gaussian filter or any lowpass filter to smooth out pixel signal values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

A gradient of the processed image is then calculated. There are various methods available to calculate the gradient, including Laplacian, and Sobel. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation $Sx[k, q]=U[k, q+1]-U[k, q-1]$. Sobel Y-operator at the same location is given by the equation $Sy[k,q]=U[k+1,q]-U[k-1,q]$, where U is an image signal of the processed image.

Orientation Tagging

Figures 4, 5:
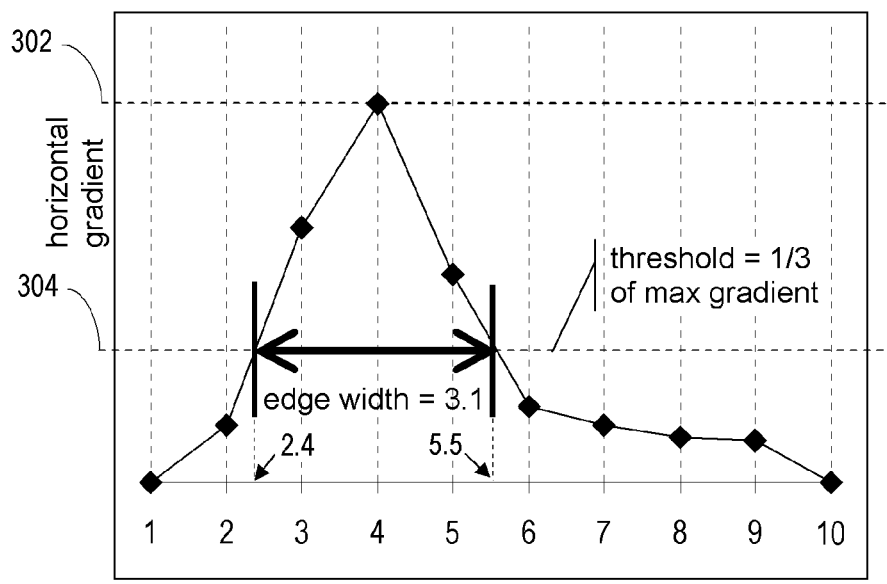
FIG. 4 is an illustration of a horizontal Sobel operator's operation on a image signal matrix.
FIG. 5 illustrates a calculation of edge width from a horizontal gradient.

Each pixel is tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel is tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has an direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Slant Correction

In an image, a boundary between two regions that have different brightness or hue becomes thicker or thinner as the image becomes more focused or becomes less focused. The thickness of this boundary is a width across the boundary in a direction perpendicular to the boundary.

If the boundary is vertical, the direction perpendicular to the boundary is the horizontal direction. If the boundary is horizontal, the direction perpendicular to the boundary is the vertical direction.

Within the boundary, an image signal (e.g. luminosity, blue chroma signal, or red chroma signal) has a transition from one side of the boundary to the other side. The visually perceived extent of the boundary covers a vicinity of where the transition is steepest.

If the boundary is vertical, the steepness of the transition is reflected in a gradient signal generated horizontally across the boundary, from one side to the other. A neighborhood of where the gradient signal peaks and a width of the neighborhood therefore correspond to the visually perceived extent of the boundary and a thickness of the boundary, respectively. The neighborhood is a group of adjacent pixels whose horizontal gradients are above a predetermined fraction of a peak gradient. The neighborhood is a vertical edge, as defined earlier in this description, and the width of the neighborhood is an edge width of the vertical edge. The vertical boundary then can be seen as comprising a plurality of such vertical edges arrayed vertically.

Likewise, if the boundary is horizontal, it can be seen as comprising a plurality of horizontal edges arrayed horizontally and their edge widths represent the thickness of the horizontal boundary.

Figure 6A:
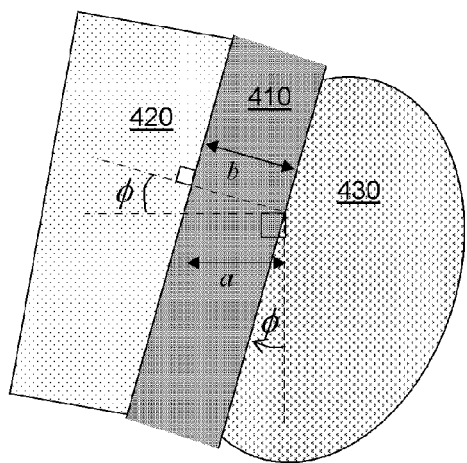
FIGS. 6A, 6B are illustrations of a calculation of an edge width of a vertical edge in a boundary having a slant angle φ.
Figure 6B:
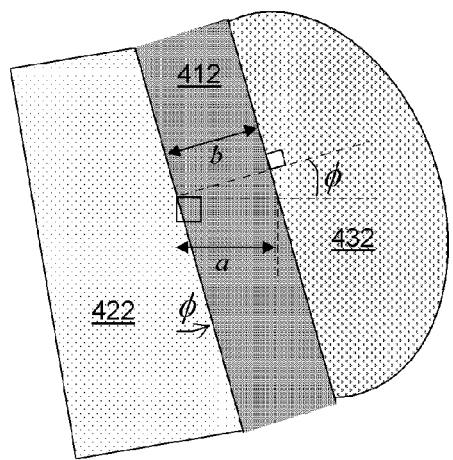
Figure 6C:
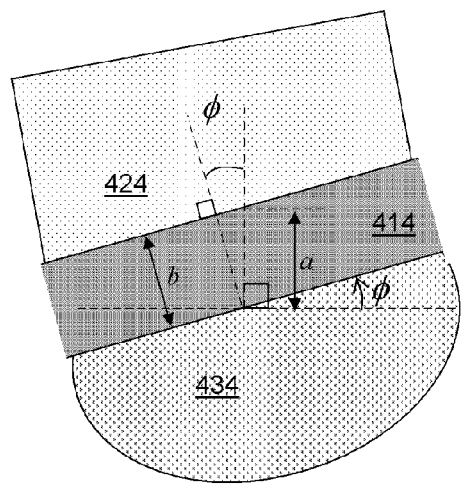
FIGS. 6C, 6D are illustrations of a calculation of an edge width of a horizontal edge in a boundary having a slant angle φ.
Figure 6D:
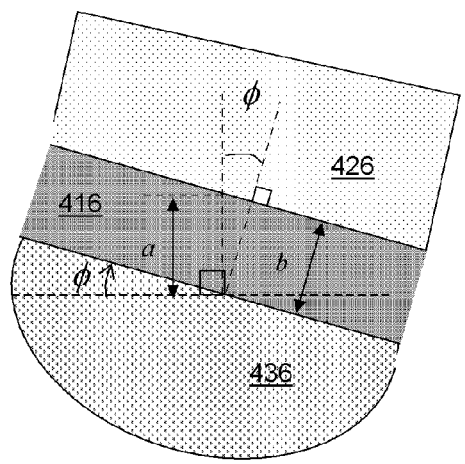

However, not all boundaries between regions in an image are oriented vertically or horizontally. Many boundaries are inclined with respect to the vertical and horizontal directions, and usually less inclined with respect to one than the other. This situation is illustrated in FIGS. 6A to 6D. In FIG. 6A, boundary 410 is a straight boundary between region 420 and region 430 and is inclined from a vertical dashed line at a slant angle $\phi$ in a clockwise manner. In FIG. 6B, boundary 412 is a straight boundary between region 422 and region 432 and is inclined from a vertical dashed line at a slant angle $\phi$ in an anti-clockwise manner. In FIG. 6C, boundary 414 is a straight boundary between region 424 and region 434 and is inclined from a horizontal dashed line at a slant angle $\phi$ in an anti-clockwise manner. In FIG. 6D, boundary 416 is a straight boundary between region 426 and region 436 and is inclined from a horizontal dashed line at a slant angle $\phi$ in a clockwise manner.

As shown in FIGS. 6A to 6D, the thicknesses of the boundaries (shown as b) that are the widths perpendicularly across the boundaries are independent of the slant angle $\phi$. Widths measured in the horizontal direction across the boundaries (shown as a) in FIGS. 6A and 6B, and likewise measured in the vertical direction across the boundaries in FIGS. 6C and 6D, are edge widths of the edges (vertical edges for FIGS. 6A and 6B; horizontal edges for FIGS. 6C and 6D) in the boundaries. But they no longer represent the thicknesses of the boundaries, unlike in the case of the vertical and horizontal boundaries. It is the thicknesses of the boundaries, not edge widths, that remains a measure of how unfocused the boundary is in the image when the boundary is neither vertical nor horizontal. Using the edge widths as they are to form the focus signal without taking into account the slant of the boundaries to which the edges belong will cause the focus signal to be affected orientations of boundaries in the image. This is an undesirable effect that is discovered and addressed in this invention.

A solution to this problem is to correct the edge width measured in a prescribed direction (e.g. horizontal direction, or vertical direction) from the edge to obtain a width of the boundary to which the edge belongs, then to input the corrected edge widths instead of the uncorrected edge widths to the focus signal calculation. The width of the boundary is measured perpendicularly across the boundary.

The width of the boundary may be found by projecting the edge width from the prescribed direction (which is perpendicular to the edge direction) along which the edge width is measured to the direction perpendicular to the direction of the boundary. Designating the angle of slant of the boundary from edge direction as $\phi$, the correction may be performed by multiplying the edge width by $\cos(\phi)$ or an approximation thereof.

There are various methods for finding the angle of slant $\phi$. One class of method involves finding $\tan(\phi)$ or an approximation thereof from the vertical and horizontal gradients in the edge. One example is finding the ratio y/x, where x is a gradient perpendicular to the edge direction and y is a gradient parallel to the edge direction, for each pixel in a neighborhood (which may be within the edge or may be a 2-dimensional neighborhood overlapping the edge), followed by finding an average (which may be a weighted average) of the ratio within the neighborhood.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction). The corrected width b may be obtained from a projection of the measured width a to the direction perpendicular to the boundary. Such a projection may be given by $b = a \cos(\phi)$, but approximation may be used as long as it obtains accuracy to within 20%. The angle $\phi$, or $\cos(\phi)$ itself, may be found by any method known in the art for finding a direction of an edge in an image, or by a more accurate method described in the flowchart shown in FIG. 7.

Each horizontal or vertical edge's edge width may be corrected for its slant from either the horizontal or vertical orientation (the prescribed directions), respectively. FIGS. 6A, 6B illustrate a correction calculation for an edge width measured in the horizontal direction for a boundary (and hence edges that form the boundary) that has a slant from the vertical line. FIGS. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of $\cos(\phi)$, where $\phi$ is an angle of slant from the prescribed direction. This slant angle $\phi$ may be used further in the exclusion filter 207 and exclusion calibrator 205.

Figures 7, 8:
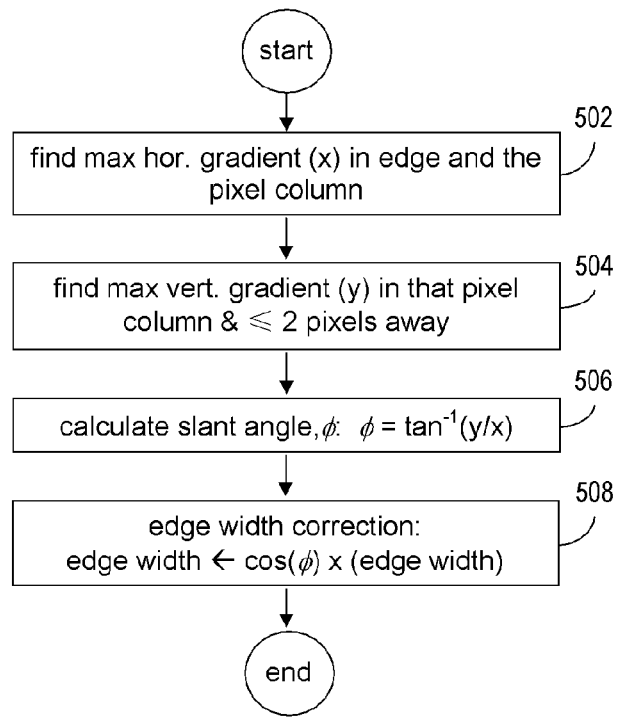
FIG. 7 is a flowchart of a process to calculate a slant angle φ and correct an edge width for a vertical edge in a boundary having a slant.
FIG. 8 is an illustration of a vertical concatenated edge.

By way of example, FIG. 7 shows a flowchart of a process to correct edge widths for slant for edges in a boundary inclined from a vertical line. (For horizontal edges in a boundary inclined from a horizontal line, substitute 'row' for 'column', and interchange 'vertical' with 'horizontal' in the flowchart.)

From step 502 to step 506, a slant angle $\phi$ is found. For each vertical edge, at step 502, locate the column position where the horizontal gradient magnitude peaks, and find the horizontal gradient x. At step 504, find a vertical gradient that has the largest magnitude along the column position and within two pixels away, and let y be this vertical gradient.

At step 506, find the slant angle $\phi = \tan^{-1}(y/x)$. At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with $\cos(\phi)$, or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to $\cos(\tan^{-1}(y/x))$ to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then to input q to a lookup table that has entries for various values of q. For each value of q, the lookup table returns an edge width correction factor. The edge width correction factor may be an approximation to $\cos(\tan^{-1}(q))$ to within 20%, preferably within 5%.

For finding the slant angle $\phi$ (or an approximation thereto such that the correction factor is accurate to within 20%) and subsequently the correction factor $\cos(\phi)$ (or an approximation thereto), or to directly find the correction factor without finding the slant angle $\phi$ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find q=y/x for this pixel, and (c) find a correction factor that corresponds to q, for instance $\cos(\tan^{-1}(q))$ or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

A fourth modification is, at step 504, find a vertical gradient that has the largest magnitude within two columns and two rows from the peak horizontal gradient, and let y be this vertical gradient.

Other modifications are possible along these directions or other.

Screen Threshold

Figure 9A:
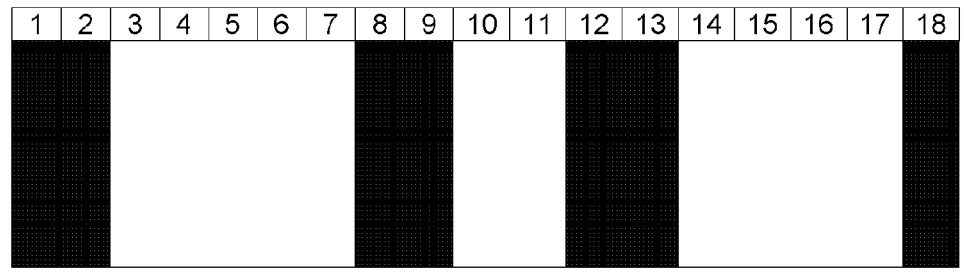
FIG. 9A is an illustration of a group of closely-packed vertical bars.
Figure 9B:
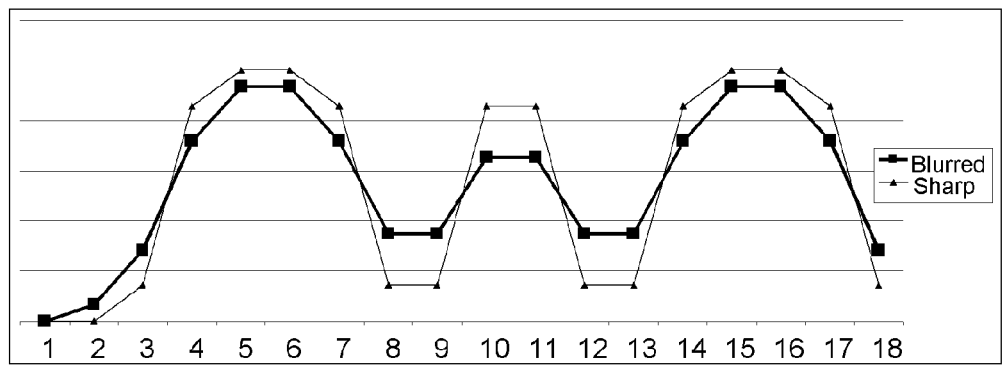
FIG. 9B is a graph of an image signal across FIG. 9A.
Figure 9C:
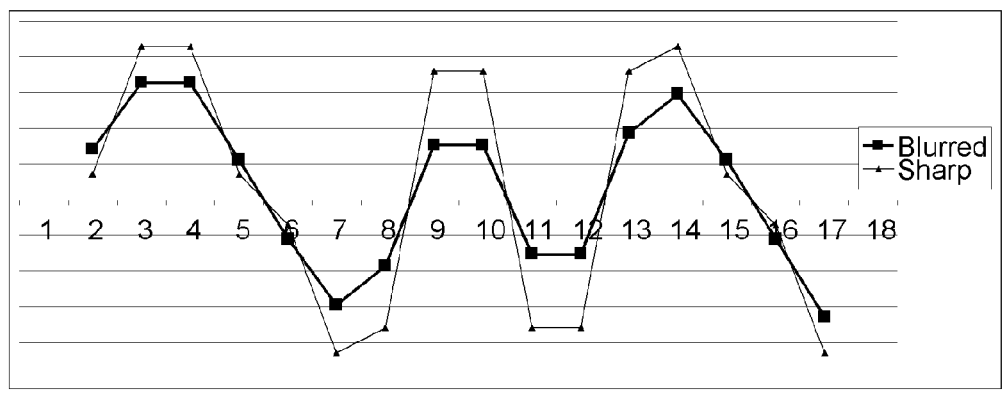
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges.

The Edge Detection and Width Measurement Unit 206 may execute the following algorithm for eliminating closely-packed narrower edges based on a screen threshold established from a wider edge, and a modulation screen flag that can be turned on and off.

Figure 10:
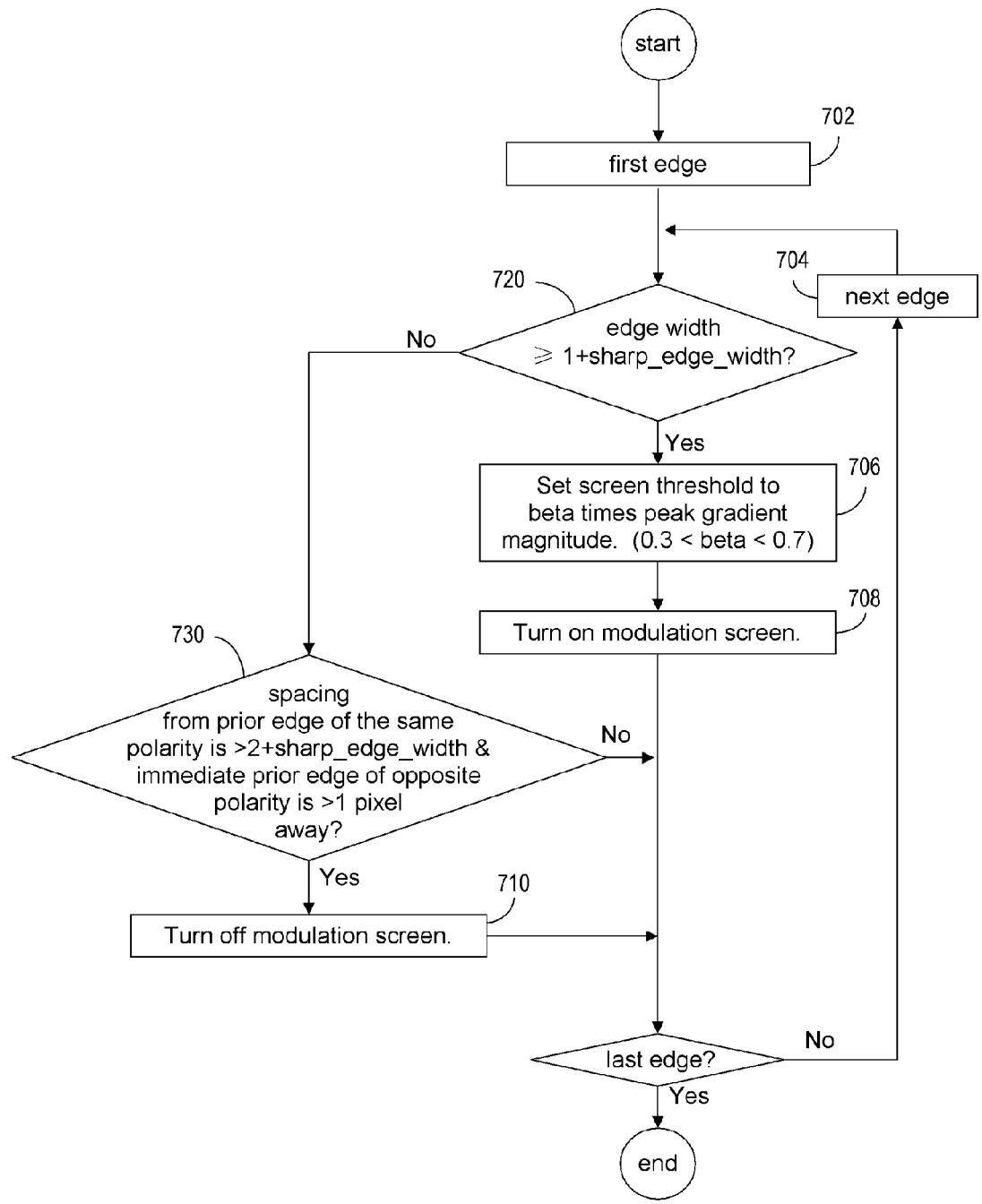
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2.

FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

For simplicity of illustration as well as implementation, the flowchart in FIG. 10 separates edges that have edge widths greater than or equal to one plus sharp_edge_width as the wider edges away from the rest of edges (the narrower edges). But the meaning of wider edges is not thus limited: a wider edge is simply wider than a narrower edge.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112'', for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210 and after the exclusion switch 230, wherein the edges processed by the Length Filter 212 are those that pass through either or both of the width filter 209 and exclusion filter 207 depending on the 'fine' and 'exclude' command signals.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
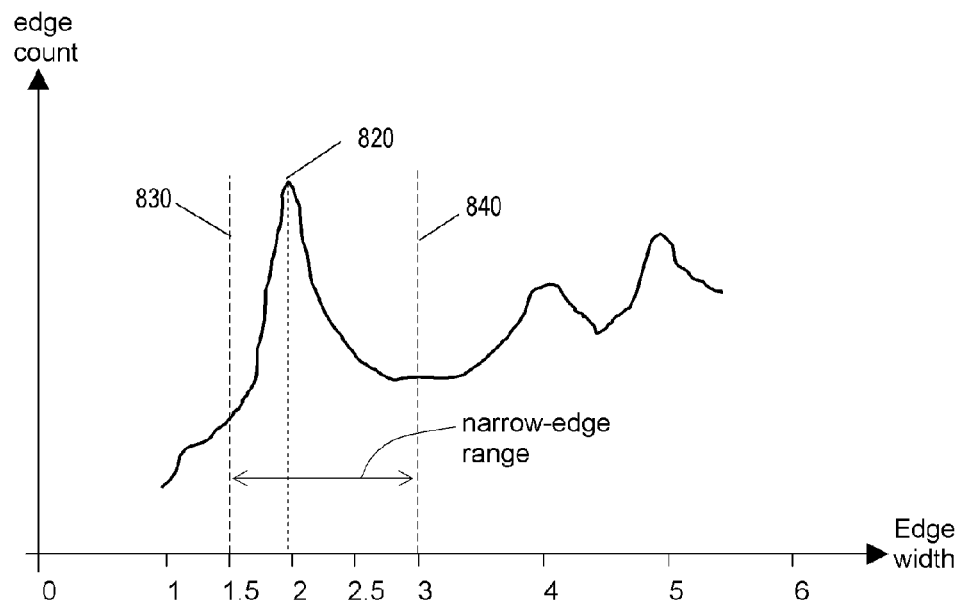
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter

209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i = c_i$, $c_i$ being the edge count at edge width $e_i$, i being a bin number of a histogram of edge widths. Alternately, the weight at each edge width may be the edge count for the edge width multiplied by the edge width itself, i.e. $w_i = c_i e_i$. In addition, preferences from the Width Filter 209 that are expressed in terms of weights may be further multiplied to each edge width. For example, for weights $\Omega_i$ produced by the Width Filter 209, $\Sigma \Omega_i = 1$, focus signal may be calculated as $\Sigma \Omega_i w_i e_i / \Sigma \Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
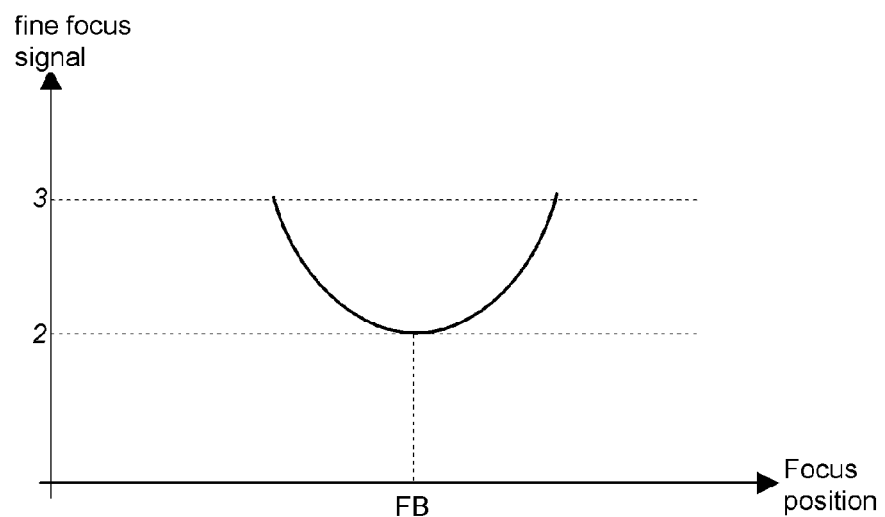
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
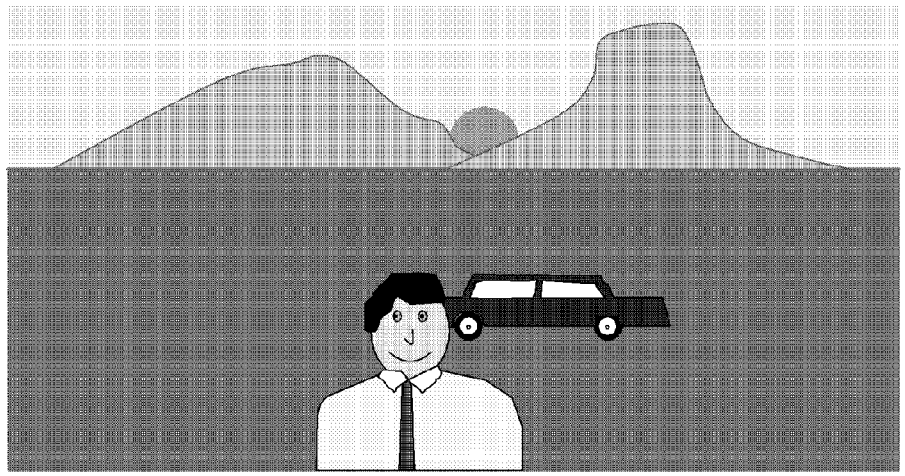
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
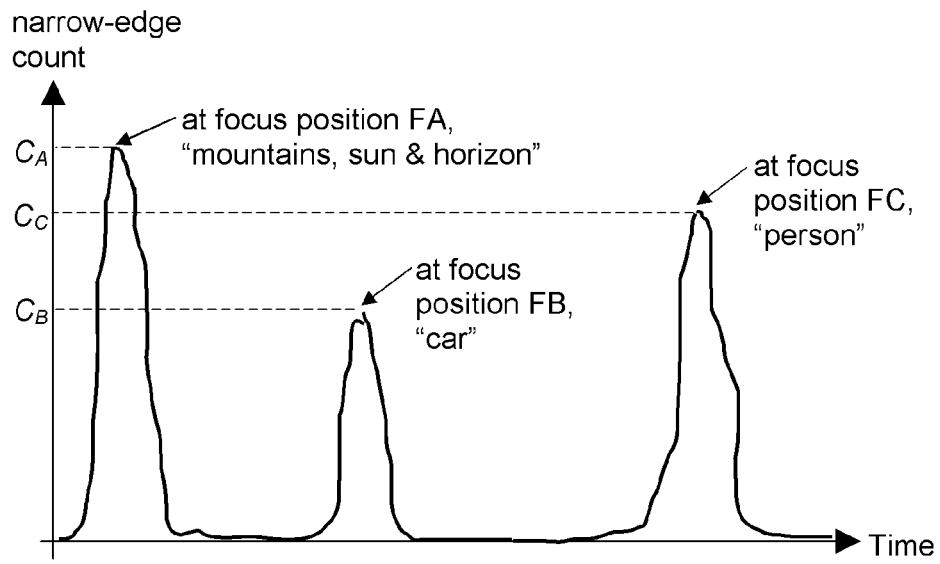
FIG. 13 is a graph illustrating a variation of a narrow-edge count during a focus scan of the scene of FIG. 12

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
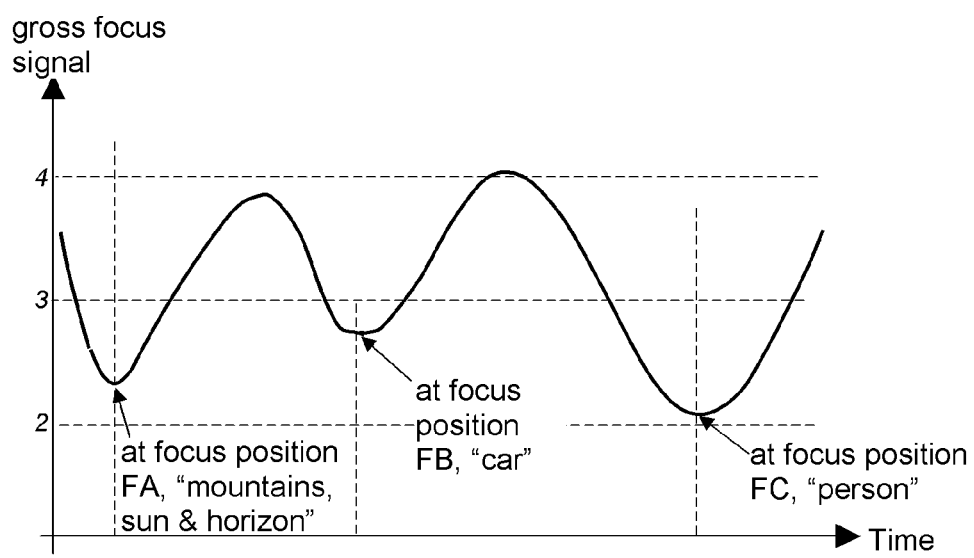
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
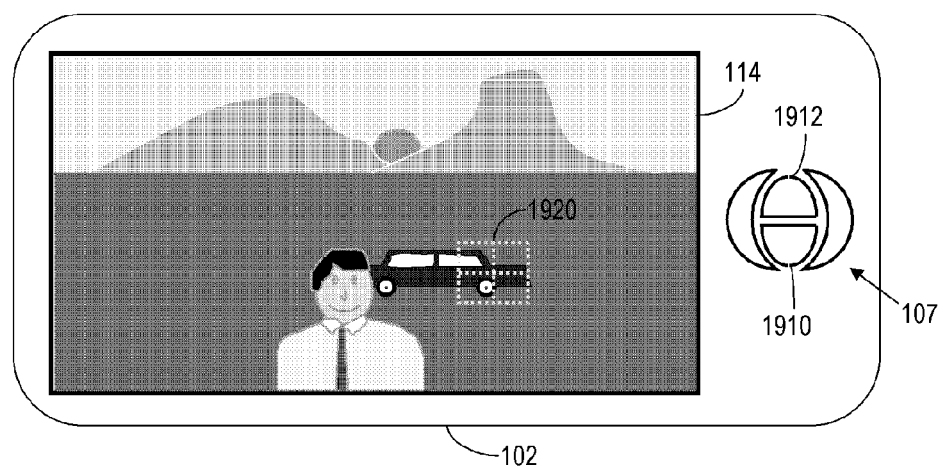
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Exclusion Filtering

Below describes exclusion filtering performed by exclusion filters 207, 910.

Broadly defined, given one or more image characteristics and one or more exclusion ranges defined for each characteristic, exclusion filtering creates a preference for edges that do not fall into any one exclusion range in any one characteristic.

The collection of image characteristics may be predetermined. The following is a non-exhaustive list: hue (FIG. 23), hue pair, hue change, saturation, maximal luminance (FIG. 22), luminance change (FIG. 24), mean luminance, slant angle (FIGS. 6A-6D and 44), length of concatenated edge (FIGS. 8 and 43), and spacing to nearest edge.

A first embodiment of an exclusion filter is to eliminate edges that belong to any one exclusion range in any one characteristic given to the exclusion filter.

Figure 21:
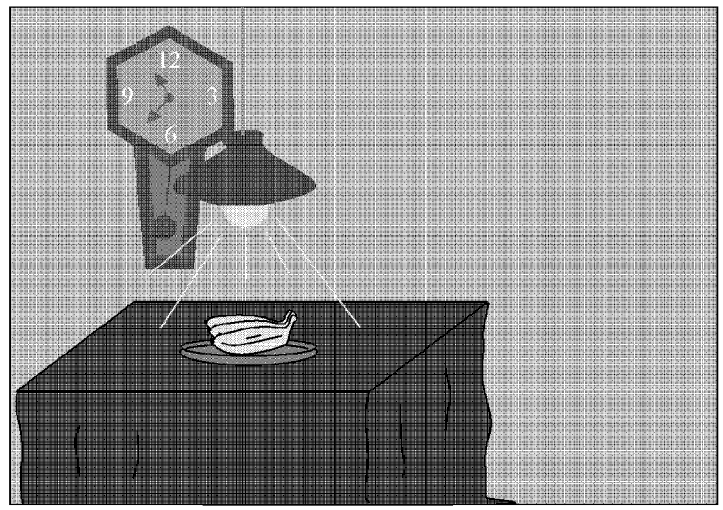
FIG. 21 is an illustration of a scene having edges at different focus distances each under a different illumination.
Figure 22:
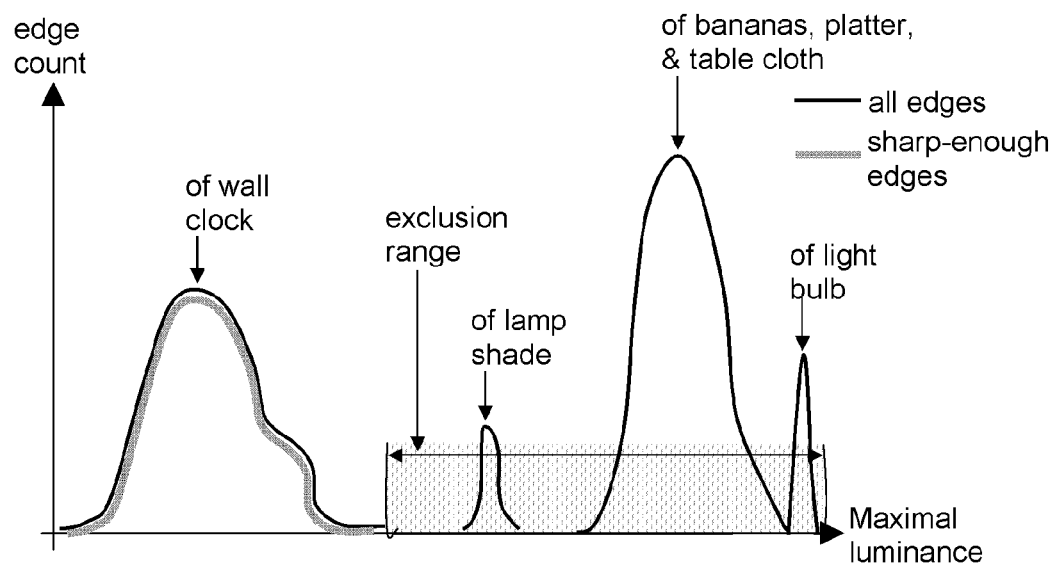
FIG. 22 is a first histogram of maximal luminance of edges and a second histogram for only sharp-enough edges within a region (wall clock) of FIG. 21.

FIG. 22 illustrates a use of maximal luminance as a characteristic for exclusion. FIG. 22 illustrates an all-edge and sharp-edge histograms for maximal luminance of an image captured of the scene illustrated in FIG. 21 with only the wall clock in sharp focus. Maximal luminance is the highest luminance value within an edge. FIG. 22 shows a histogram for sharp edges (associated with the wall clock in FIG. 21) and a histogram for all edges, associated with other objects (lamp shade, bananas, platter, table cloth, light bulb) in the image that are not in sharp focus as well as the wall clock. In FIG. 22, the wall clock occupies a lower range of maximal luminance than all other objects, which are brightly illuminated. An exclusion range (shown in FIG. 22) covering approximately the upper half of the maximal luminance range de-emphasizes or even excludes altogether most edges that are not in sharp focus.

Figure 23:
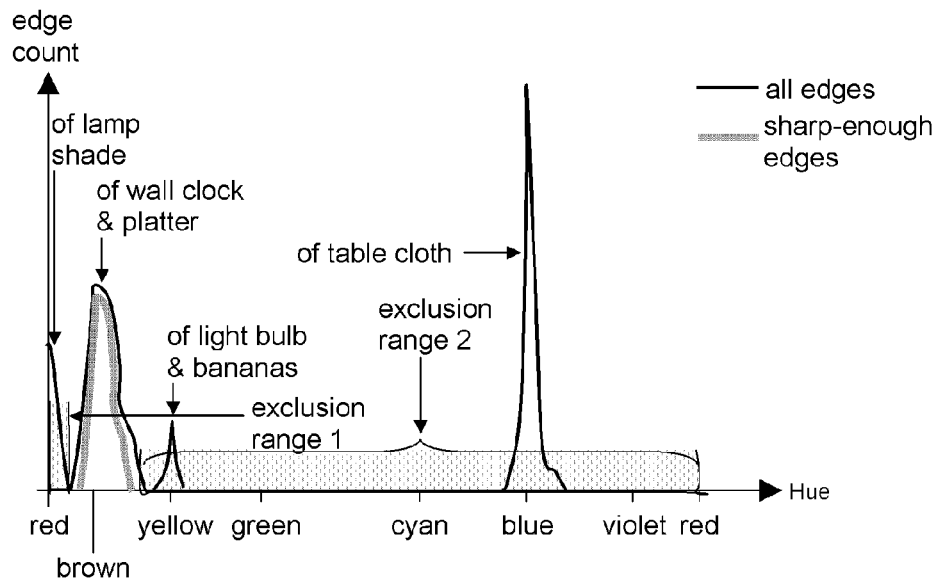
FIG. 23 is a first histogram of a hue of edges and a second histogram for only sharp-enough edges within a region (wall clock) of FIG. 21.

FIG. 23 illustrates a use of hue as a characteristic for exclusion. FIG. 23 shows a histogram for sharp edges (associated with wall clock in FIG. 21) and a histogram for all edges, associated with other objects in the image that are not in sharp focus as well as the wall clock. For this hue histogram, if both sides of an edge has the same hue value, the hue bin that contains the hue value gets a count contribution of +2 from this edge; whereas if each side has a different hue value, then each hue bin that contains one of the hues gets a count contribution of +1. In FIG. 23, the wall clock and the platter together occupy a small range of hue in the vicinity of a brown hue. Exclusion range 1 and exclusion range 2 (shown in FIG. 23) that together cover most of the rest of the hue range would exclude most edges that are not in sharp focus except those arising from the platter, which are not a major part of non-sharp edges. An edge would be de-emphasized or even excluded altogether by an exclusion filter operating by these two exclusion ranges if both hues on its two sides fall within any of these exclusion ranges.

Hue pair may be used as a characteristic for exclusion. A first hue from one side of an edge and a second hue from the other side of the same edge can be measured and together used to assign the edge to one of the bins in a histogram that has a two-dimensional abscissa. Each bin in the two-dimensional abscissa corresponds to a first range of hues on one side of the edge and a second range of hues on the other side of the edge.

Figure 24:
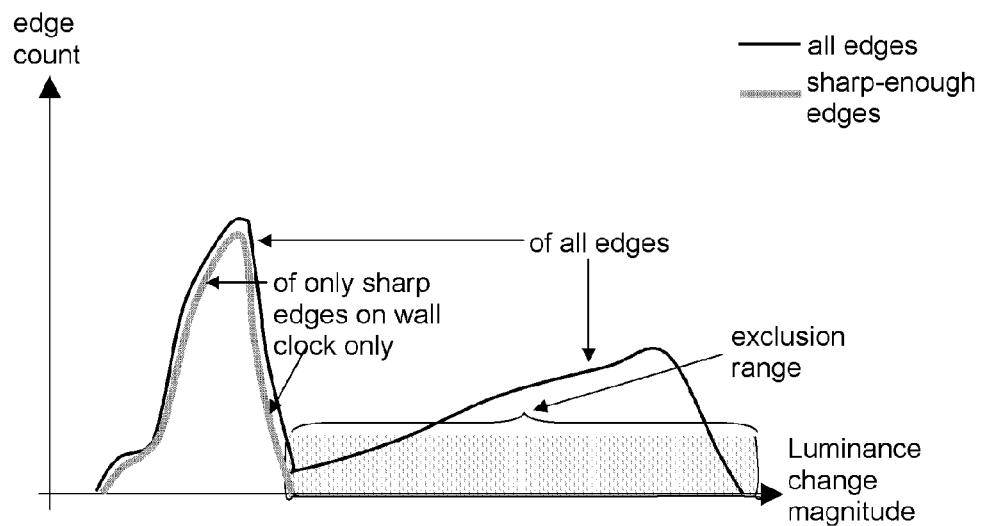
FIG. 24 is a first histogram of luminance change magnitude across edges and a second histogram for only sharp-enough edges within a region (wall clock) of FIG. 21.

Hue difference may be used as a characteristic for exclusion. A change of hue from one side of an edge to the other side of the same edge can be measured and used to assign the edge to one of the bins in a histogram that has a plurality of bins each for a range of hue-difference. FIG. 24 illustrates a use of luminance change as a characteristic for exclusion. Luminance change is a magnitude of change of luminance across an edge. FIG. 23 shows a histogram for sharp edges (associated with wall clock in FIG. 21) and a histogram for all edges, associated with other objects in the image that are not in sharp focus as well as the wall clock. In FIG. 24, the edges from wall clock occupy a small region at the lower range, and an exclusion range (shown in FIG. 24) covering the upper range would de-emphasize or even exclude altogether most edges that are not in sharp focus.

Figure 43:
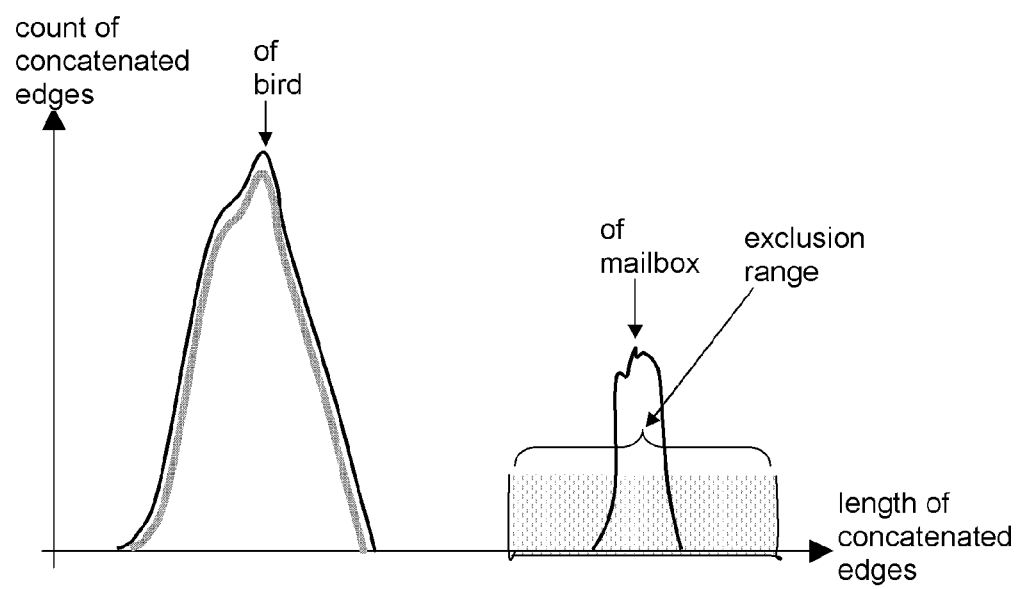
FIG. 43 is a first histogram of a length of concatenated edges and a second histogram of only concatenated sharp-enough edges (bird) of FIG. 42A.

FIG. 43 illustrates a histogram of length of concatenated edges and an exclusion range for the scene of FIG. 42A. Such a histogram may be used to separate objects having different sizes.

Spacing to nearest edge is another image characteristic. To each vertical (horizontal) edge is calculated and associated a spacing along a same row (column) to a nearest neighboring vertical (horizontal) edge ("edge spacing"). The edge spacings of all edges and sharp-enough edges have their respective histogram. Exclusion ranges for edge spacings are formed like for the other characteristics. Edge spacing can be used to distinguish objects that have many small details, for example a tree with many leaves and branches, from other objects that do not have similar densities of details, for example a car.

An alternate embodiment of exclusion filter is to create an exclusion-weight in the exclusion filter 212 and/or 910 for each edge and apply the exclusion weight to a calculation of focus signal in the focus signal calculator 210. An edge whose value for a first characteristic falls within an exclusion range of the first characteristic receives a lesser weight for the characteristic ("characteristic weight") than one whose value fall outside all exclusion ranges. For example, the characteristic weight may be 0 in the middle of an exclusion range, rises to 1 at the edges of the exclusion range, and 1 everywhere outside all exclusion ranges. If the exclusion filtering uses only one characteristic, the characteristic weight is the exclusion weight. If two or more characteristics are used, each characteristic has a characteristic weight for each edge, and all characteristic weights may be multiplied together to form the exclusion weight. Thus each edge may have a first, a second, and a third characteristic weight where three different characteristics are used in an exclusion chain, and the exclusion weight would be the product of all three characteristic weights. Thus, a contribution of each edge towards the focus signal may be multiplied by a factor E/G before summing all contributions to form the focus signal, where G is the sum of exclusion weights of all edges that enter the focus signal calculation, and E is the exclusion weight of the edge. Likewise, the edge-width histogram, which may be output as part of signals 134, may have edges that are not members to any exclusion range of any characteristic contribute more to the bins corresponding to their respective edge widths instead of all edges contribute the same amount, e.g. +1. Thus, for example, each edge may contribute E/H instead of +1 towards the bin of the edge-width histogram, where H is an average of E among edges that are counted in the histogram. Similarly, the narrow-edge count may have edges that are not members to any exclusion range of any characteristic contribute more. Thus, for example, the contribution from each edge may be multiplied by E/J, where J is an average of E among edges that are counted in the narrow-edge count.

Exclusion Calibration

Referring next to the exclusion calibrator 205 of FIG. 3, the exclusion calibrator 205 receives edges, edge widths, and the input image, and processes them to generate various exclusion control parameters to configure the exclusion filter 207. The exclusion calibrator 205 may further receive control signals 'calibrate command', 'index', and 'R/W'. These control signals may come from a focus system controller, e.g. processor 112 of FIG. 1 or 2.

The exclusion calibrator 205 is configured to inspect one or more image characteristics of edges in general and separately of sharp edges in particular upon a command on a 'calibrate command' input control signal, and create one or more exclusion ranges in those characteristics to exclude substantial amount of edges that are not sharp enough. Sharp-enough edges are edges whose widths fall within a predetermined narrow range ("sharp-edge range") surrounding sharp_edge_width. A sharp-edge range may be contained within the narrow-edge range. For example, a sharp-edge range may be +/−0.2 around sharp_edge_width. If sharp_edge_width is 2.0, a sharp-edge range may be from 1.8 to 2.2, whereas a narrow-edge range may be from 1.5 to 3.0. The exclusion ranges may be memorized under a unique index value provided by the 'index' input control signal by providing a write command on the 'R/W' input control signal. Multiple sets of exclusion ranges may be memorized, each with a different index value. A set of exclusion ranges may be retrieved by providing its associated index value on the 'index' input control signal and a read command on the 'R/W' input control signal. The retrieved exclusion ranges may be applied by the exclusion filter 207 in FIG. 3 to exclude edges that fall within these exclusion ranges. The exclusion ranges of a first characteristic may be applied before those of a second characteristic.

Figure 17:
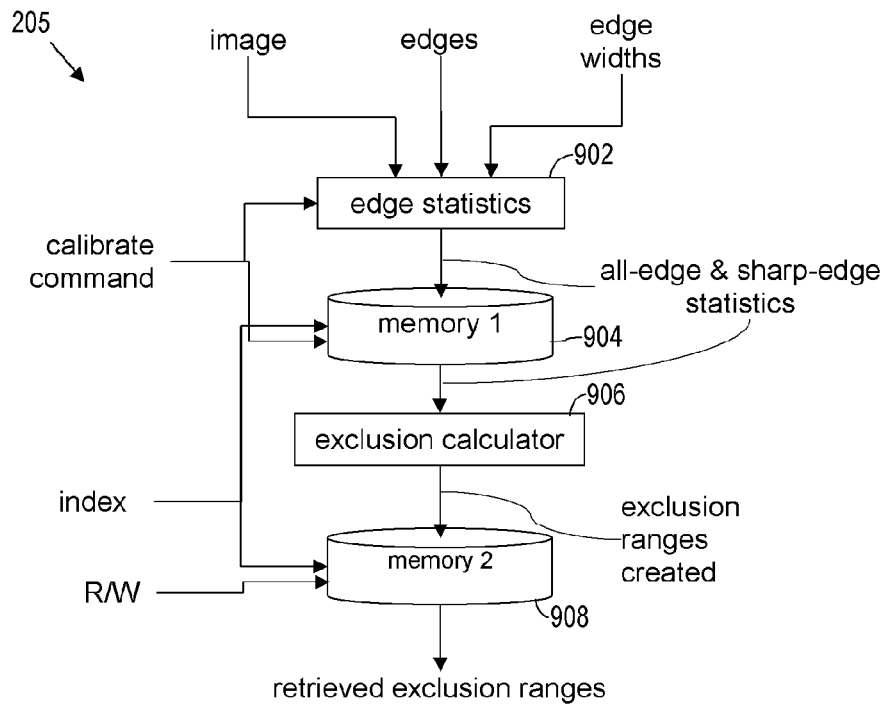
FIG. 17 is a block diagram of a first embodiment of an exclusion calibrator.

FIG. 17 shows a block diagram of one embodiment of an exclusion calibrator. Edge Statistic unit 902 receives an image, a set of edges, and edge widths. It calculates all-edge statistics, which are histograms for one or more characteristics associated with these edges. It also calculates sharp-edge statistics, which are histograms for the same characteristics but only on edges whose edge widths fall within the sharp-edge range. Both all-edge statistics and sharp-edge statistics may be stored in a memory-1 904. The exclusion calculator 906 receives both sets of statistics, performs calculation to form exclusion ranges in one or more characteristics based on histograms therein, and outputs to a memory-2 908, which may store these exclusion ranges under an index value provided on input control signal 'index' upon a write command on the input control signal 'R/W'.

Figure 18:
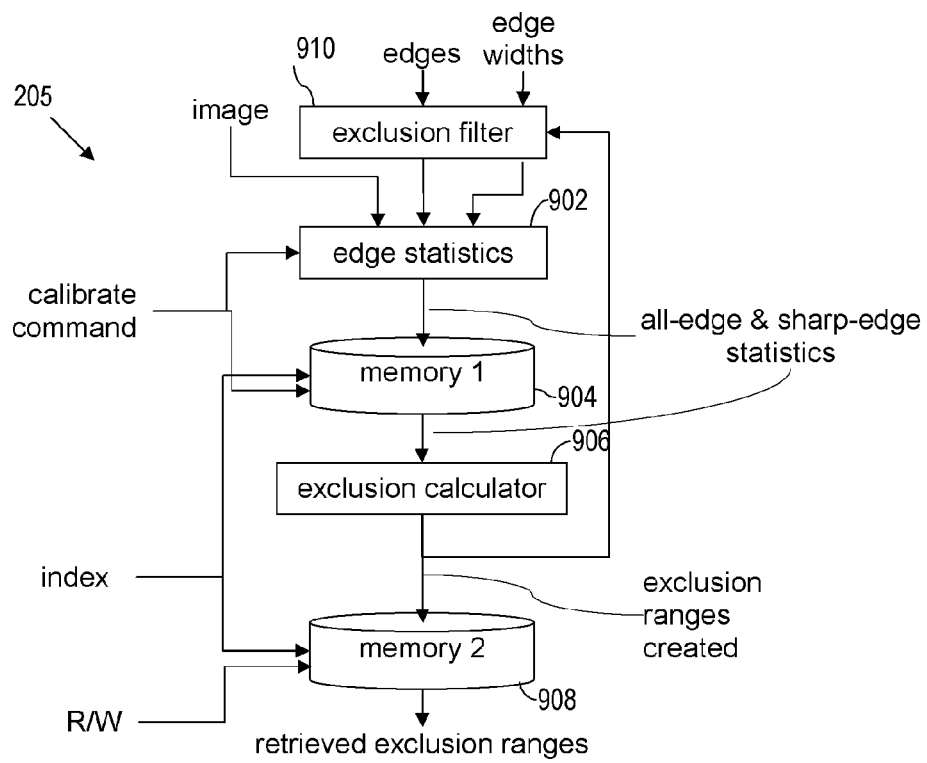
FIG. 18 is a block diagram of a second embodiment of an exclusion calibrator.

FIG. 18 is a block diagram of an alternate embodiment of an exclusion calibrator. This embodiment adds an exclusion filter 910 to the structure of FIG. 17. The exclusion filter 910 filters by a chain of sets of exclusion ranges, each set corresponding to a different characteristic. Edges are filtered by one set after another in the chain. At each iteration, the set of exclusion ranges calculated for the characteristic analyzed at the prior iteration is appended to the chain of sets of exclusion ranges. The resultant edges and edge widths (and exclusion weights, if the exclusion filter 910 follows the aforementioned alternate embodiment of exclusion filter) output by the exclusion filter 910 and further filtered by the newly added set are analyzed by Edge Statistics unit 902 to generate a new set of all-edge statistics and sharp-edge statistics (and exclusion weights, ditto). The exclusion calculator 906 analyzes the new set of all-edge statistics and sharp-edge statistics (and exclusion weights, ditto) and selects the next characteristic and its sets of exclusion ranges. A characteristic not used in prior iterations is chosen.

Figure 20:
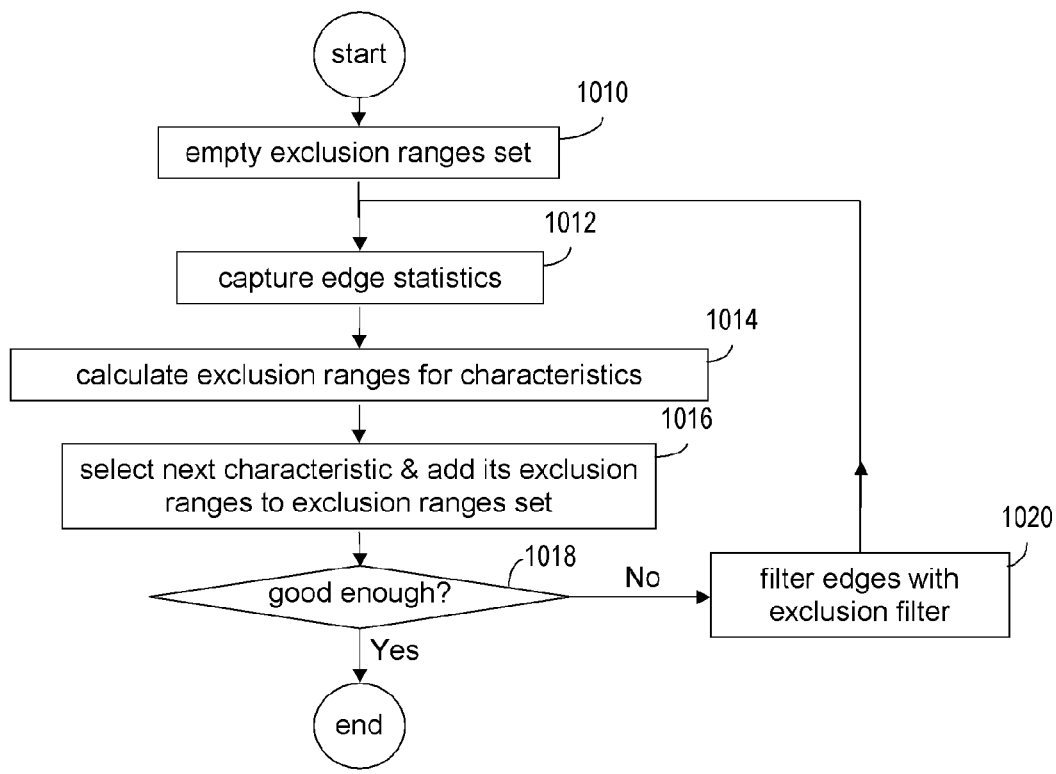
FIG. 20 is a flowchart of a process to determine a chain of exclusion ranges for multiple edge characteristics.

The flowchart in FIG. 20 illustrates this process. At step 1010, the chain of sets of exclusion ranges is initialized to empty. At step 1012, edge statistics unit 902 generates all-edge statistics and sharp-edge statistics for a number of characteristics for edges and associated edge widths received from exclusion filter 910. At step 1014, exclusion calculator 906 calculates exclusion ranges for a number of characteristics not used in prior iterations. At step 1016, a next characteristic is chosen from the abovementioned characteristics and its associated set of exclusion ranges is appended to the chain of exclusion range sets. At step 1018, a query on "good enough" (described below) is made. If answer is yes, the iterative process is done, and the chain of sets of exclusion ranges may be stored to the memory-2 908. If not, at step 1020, the exclusion filter 910 further filters those edges and their associated edge widths previously input to step 1012 with the latest added exclusion ranges, and subsequently a new iteration starts at step 1012 to re-calculate edge statistics.

Each iteration in FIG. 20 may choose a different characteristic that is not used in prior iterations in one of several ways. In a first way, the sequence of all characteristics may be predetermined, such that each next iteration uses the next characteristic down the sequence. In a second way, to choose between a first characteristic and a second characteristic to become a next characteristic, the characteristic that generates exclusion ranges that de-emphasize or even exclude more edges that survive into the current iteration may be preferred over the other characteristic. This preference may be reversed if the characteristic de-emphasizes or removes more than a certain fraction, e.g. 10%~50%, preferably 20%, of sharp edges. This selection procedure for a next characteristic is applicable to the embodiment of FIG. 17 as well as the embodiment of FIG. 18.

In general, a first characteristic may be preferred over a second characteristic if the former results in a greater increase in a ratio of sharp-enough edges to all edges among the surviving edges after a re-filtering using a corresponding set of exclusion ranges.

Exclusion ranges corresponding to a number of different indices may be combined to form new exclusion ranges that are stored under a new index. For each characteristic present under one or more of said different indices, the exclusion ranges of said characteristic under said different indices may be logically ANDed across said indices followed by an inversion to form new exclusion ranges such that a value is within such new exclusion ranges if and only if said value is not within an exclusion range for said characteristic for at least an index that has said characteristic in its exclusion chain. Effectively, such new exclusion ranges for said characteristic tries to exclude sharp-enough edges from all of said different indices. One or more characteristics may be operated upon in this manner to generate new exclusion ranges. Such characteristics may form an exclusion chain. An exclusion calibrator may receive a command input that specifies a set of different indices along with the new index to store the resultant exclusion chain under. A new exclusion chain thus formed under a new index may be retrieved to apply on the exclusion filter 207 to exclude edge contributions from a number of objects already calibrated for to discover remaining objects in the scene.

The exclusion calibration works in iteration from the start of the calibrate command until either a certain "good enough" condition is met or no more characteristics remain. Then the entire chain of set of exclusion ranges may be stored in the memory-2 808 along with the index value from the 'index' input control signal or transmitted to the processor 112, 112', 112" or both. The "good enough" condition can be met in one of several ways. In one, the condition is met if the chain of exclusion ranges has a predetermined number of characteristics, for example three. In a second, the condition is met if, for example, 75% or some other percentage between 50% to 100% of edges that are not sharp-enough edges are eliminated after exclusion filtering. In a third, the condition is met if the number of sharp-enough edges outnumber the rest by three to one or some other ratio not less than two to one after exclusion filtering. "Good enough" condition may be anyone of the above, or combination thereof, or other reasonable condition that indicates that what remains after exclusion filtering are not dominated by edges other than sharp-enough edges.

Figure 19:
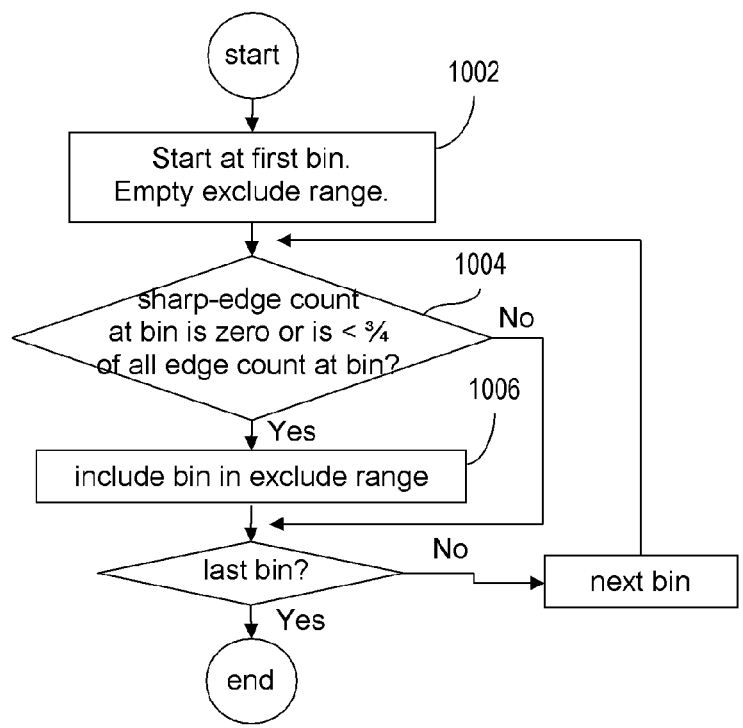
FIG. 19 is a flowchart of a process to determine exclusion ranges for one edge characteristic.

FIG. 19 is a flowchart for the exclusion calculator 906 shown in FIGS. 17 and 18 to generate exclusion ranges for each characteristic. The characteristic's range may be divided into bins, each bin covering a fraction of the range, and all bins together cover the entire range, and adjacent bins do not overlap except sharing the common boundary. Starting with the first bin at step 1002, the exclusion range is emptied. At step 1004, the count of sharp-enough edges is compared with the count of all edges. If the count of sharp-enough edges in this bin is either zero or less than a given fraction, e.g. three quarters, of the count of all edges in this bin, include this bin in the exclusion range. Repeat steps 1004 and 1006 until all bins are done.

An exclusion calibrator may create a separate set of exclusion ranges ("pointed exclusion ranges") by further limiting sharp-enough edges to be within a given region in the image. To do so, sharp-edge statistics is further tightened to exclude edges that lie outside the given region. The given region may be formed, for example, in FIG. 16, from a selection region 1920 shown overlapping the displayed image in the display 114. The selection region 1920 indicates an object desired to be in sharp focus. Thus if there were a different object outside the selection region 1920 but at the same focus distance as the object within the selection region 1920, the different object does not interfere with the formation of exclusion ranges to reject edges not pertaining to the desired object. The exclusion calibrator may create and memorize a separate set of exclusion ranges corresponding to further limiting sharp-enough edges within the selection region. The given region may be formed, alternately, as a predetermined focusing region (not shown) in the center of the display of digital cameras and the viewfinder of cameras in general, often in rectangular shape or circular shape. The given region may be formed, alternately, by a touch-screen sensor overlapping the display 114. The touch-screen sensor may sense one or more strokes of touching by one or more of a stylus and fingers, for example, and provide such information as the positions of the touching to a processor to determine the corresponding selection region.

Although shown to reside together in the focus signal generator 120, one or more components of the exclusion calibrator 205 may reside instead in the processor 112, 112', 112". For example, the exclusion calculator 906 and the memory 908 may reside in the processor 112, 112', 112". In this configuration, the processor 112, 112', 112" receives all-edge and sharp-edge statistics (shown in FIGS. 17 and 18) via signals 134 for use in the exclusion calculator 906. The processor 112, 112', 112" may perform the process of the flowchart in FIG. 19 and/or 20 entirely within itself or in conjunction with the focus signal generator 120, 120'.

Use with Exclusion

Exclusion calibrator 205 and exclusion filter 207 together may be used to form a chain of exclusion ranges to eliminate edges that do not belong to the object in sharp focus in one image captured at a time. The same chain of exclusion ranges may subsequently be used to eliminate those other edges even though the object has moved relative to the background objects. Doing so allows the edges of the object to continue to dominate the focus signal. Exclusion filtering may be operated whether or not the width filter 209 is bypassed by the fine switch 220 in FIG. 3. If the width filter 209 is bypassed, i.e. the focus signal is a gross focus signal, those two outlier peaks in FIG. 11 at edge widths of 4.0 and 5.0 may be eliminated so that even if the previously in-focus object has moved out of focus so much that the associated peak 820 moves outside of the narrow-edge range, the gross focus signal can still provide a good feedback signal to the focus control system to estimate how much to adjust the focus position to bring the object of interest back into the narrow-edge range where the fine focus signal can provide a more accurate feedback control signal to finally bring the object into a sharp focus.

Re-calibration may be performed at any time, for example during tracking of an object of interest, by issuing a "calibrate" command to the exclusion calibrator 205. The processor 112, 112', 112" may provide the same index to the exclusion calibrator 205 as the index under which the existing calibrated exclusion ranges for the object of interest is stored. The index may be the index used to retrieve the chain of sets of exclusion ranges currently in use in the calibration filter 207. Issuing the same index as an existing index will replace the previous calibrated exclusion ranges and chain that correspond to the existing index with a new chain of sets of exclusion ranges.

A re-calibration may be performed when a selection region is created on and/or around the object of interest to limit sharp-enough edges to within the selection region only, as discussed above. The "pointed exclusion ranges" or "pointed exclusion chain" may be sent to and be used at the exclusion filter 207 instead of non-pointed exclusion ranges or chain, e.g. when the processor 112 receives a user command providing a given region in one of the abovementioned manners.

Re-calibration may be performed during movement of the object of interest within the scene causing one or more image characteristics pertaining to the object to change. For example, the user may command a given region on and/or around the object of interest as soon as the object of interest is no longer highlighted or is losing more and more of the highlight that indicates sharp edges.

For re-calibration, instead of providing the same index, the processor 112 may provide a new index to store a new chain of sets of exclusion ranges. The re-calibrated chain of sets of exclusion ranges may be stored under a new index and not over-write the existing index and its associated chain of sets of exclusion ranges. The chain of sets of exclusion ranges from the new and the existing indices may be compared to identify which characteristic(s) change, and which do not. The characteristics that do not change from the existing index to the new index may be promoted to become earlier in the new chain. The characteristics that change may be eliminated from the chain. Thus characteristics that remain unchanged over time are retained for tracking the same object over time. A characteristic may be considered having changed if replacing the characteristic's exclusion ranges in the new chain with that of the existing chain would result in a significant change in a ratio of sharp-enough edges to all edges after a re-filtering with the characteristic. A significant change in the ratio may be predetermined in terms of a percentage, for example being larger than 50%. The predetermined percentage may be specified as a function of the image or a sequence of images.

For an object of interest nearly in sharp focus such that it produces edges within the sharp-edge range, exclusion calibrator 205 and exclusion filter 207 help to eliminate edges contributed by out-of-focus objects so that contribution to the fine focus signal (for which width filter is not bypassed) is dominated by edges contributed by the object of interest to give an improvement in the accuracy of fine focus signal as an indication of focus sharpness.

When a selection region 1920 is created on and/or around the object of interest, the focus signal generator 120 may give preference in the calculation of the focus signal to edges that correspond to only the selection region 1920 ("preferred edges") under a control (not shown) of the processor 112. Preference to preferred edges may be given in one of several ways. The image provided to the focus signal generator 120 on bus 130 may be limited to within the selection region 1920. Or a weight may be applied on edges that enter the focus signal calculation such that edges outside and/or farther from the selection region 1920 have lesser weights than the preferred edges, or even zero (i.e. equivalent to being excluded from focus signal calculation altogether). Or edges that are not preferred edges may be eliminated at any one of the units within the focus signal generator 120, such as the edge detection & width measurement unit 206, the width filter 209, and the exclusion filter 207. Ways to give preferences to intra-region edges are not limited to the above. Nor is there a need for a rigid or sharp distinction between inside and outside of the selection region 1920. One skilled in the art can readily appreciate that it suffices as long as a plurality of edges are selected to correspond to the selection region and to receive such preference against a plurality of edges outside the selection region.

When a selection region 1920 is created on or around an object of interest, the processor 112 may control the focus signal generator to generate a gross focus signal that applies a preference to the preferred edges. Doing so can eliminate edges not pertaining to the object of interest. For example, in FIG. 14 is shown a gross focus signal across a sweep of focus position from far to near without applying such preference. The gross focus signal exhibits multiple minima but only one minimum, at position FB, is due to the car. By applying such preference for the car, such as by using the selection region 1920 shown in FIG. 16, the minima corresponding to the foreground "person", at position FC, and the background "mountains, sun & horizon", at position FA, can be eliminated. In addition, the gross focus signal level at position FB, corresponding to the "car", will have a value closer to the sharp-edge width. The focus control system 102 may control the focus position of the focus lens 104 to reduce the difference between the focus position FB to the current focus position by evaluating a difference between the current gross focus signal level and the sharp_edge_width by applying one of the known control methods, PI-controller. The focus control system 102 may switch to use the fine focus signal when the current focus signal level falls within a range close enough to the sharp_edge_width, such as the narrow-edge range.

Control—Scanning

Figure 25:
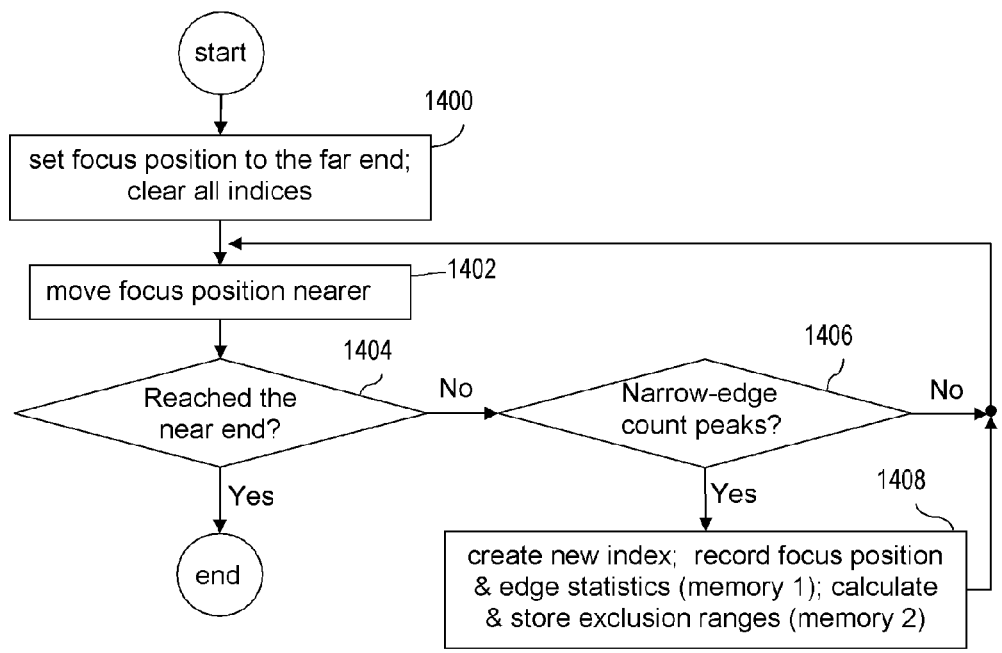
FIG. 25 is a flowchart of a process of focus scan.

FIG. 25 is a flowchart for a focus system controller such as processor 112 of FIGS. 1 and 2 to adjust the focus position and measure focus signal when moving the focus position across its range from one end to the other in search of focus positions that render sharp images of objects in the scene. At step 1400, the focus position is set to the far end. All indices for the exclusion calibrator 205 of FIG. 3 may be cleared, along with the exclusion range data in memory-2 908 of FIGS. 17 and 18. At step 1402, the focus position is moved one step closer. At step 1404, if the focus position is the near end, scanning is completed. If not, at step 1406, check to see if the narrow-edge count peaks. If not, go to the next iteration, starting back at step 1402. If yes, create a new index for this focus position, record the focus position, send a calibrate command to the exclusion calibrator 205 to gather edge statistics, form a chain of sets of exclusion ranges, and send the index and a write command to store the chain of exclusion ranges, then proceed to the next iteration, starting back at step 1402.

A chain of sets of exclusion ranges may be formed during the scanning process for each focus position where sharp images are found. In a subsequent search for any of these objects, the exclusion ranges may be applied to the focus signal generator to help de-emphasize and discriminate against edges contributed by the other objects so that the gross focus signal may exhibit a single trough and further the trough has a minimum value that is close to the sharp_edge_width, and so that the fine focus signal also has less interference from out-of-focus objects that its departure from the sharp_edge_width gives an accurate estimate of how much to adjust the focus position to bring the object into sharp focus. Both remain useful and reliable even if the object of interest moves relative to the other objects.

Figure 26:
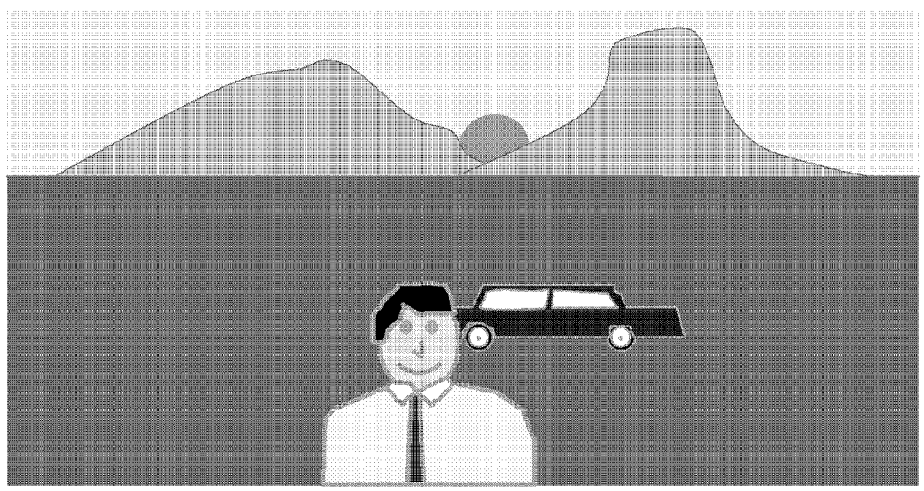
FIGS. 26-28 are illustrations of images of the scene of FIG. 12 captured at different focus positions.
Figure 27:
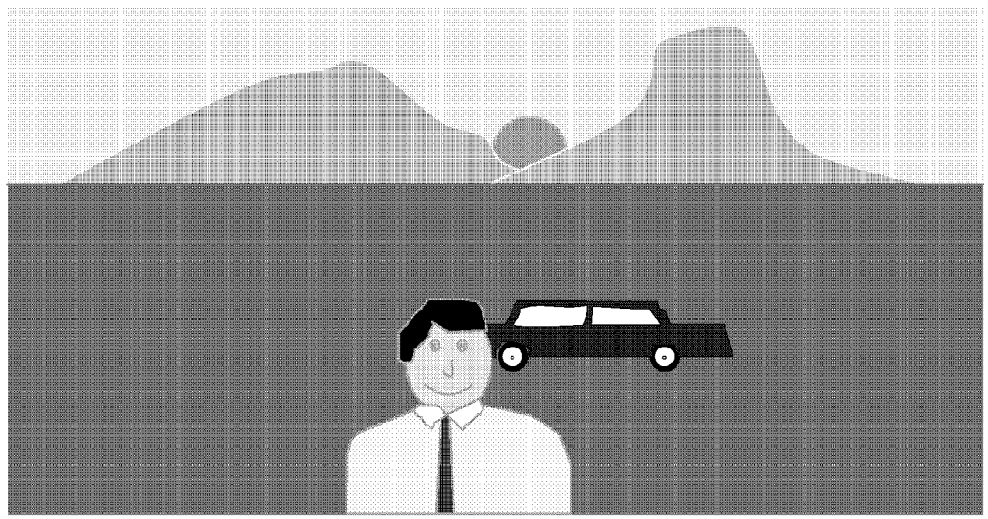
Figure 28:
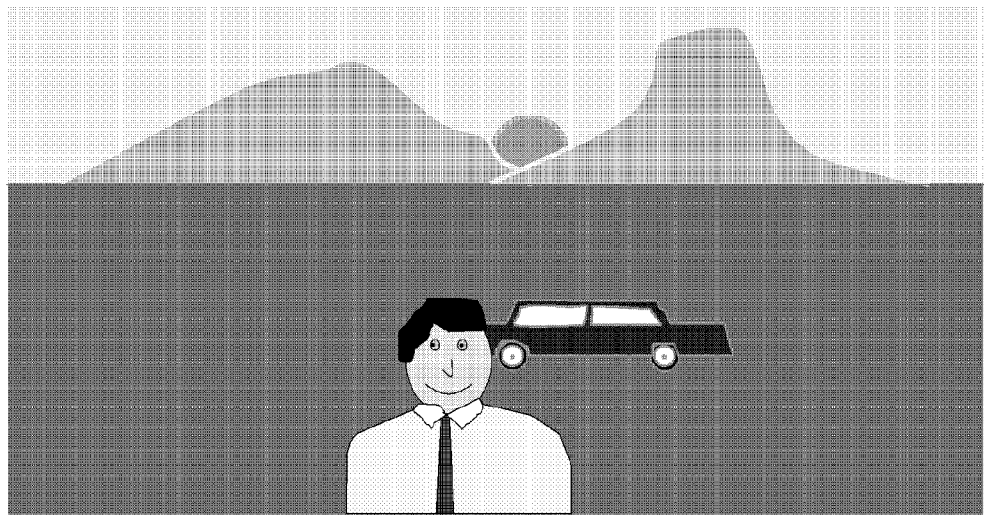
Figure 29:
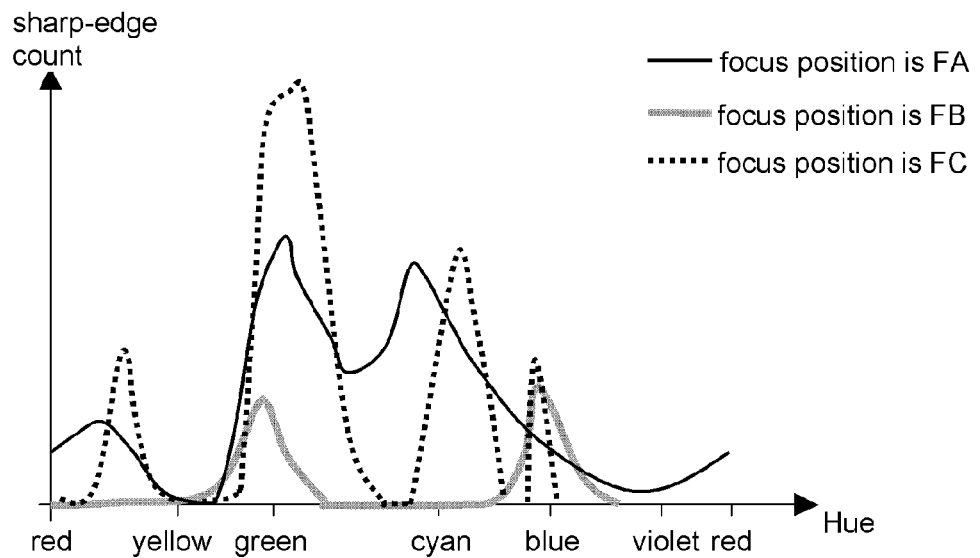
FIG. 29 is a graph illustrating a sharp-edge count versus a hue at focus positions FA, FB, and FC of FIG. 13.
Figure 30A:
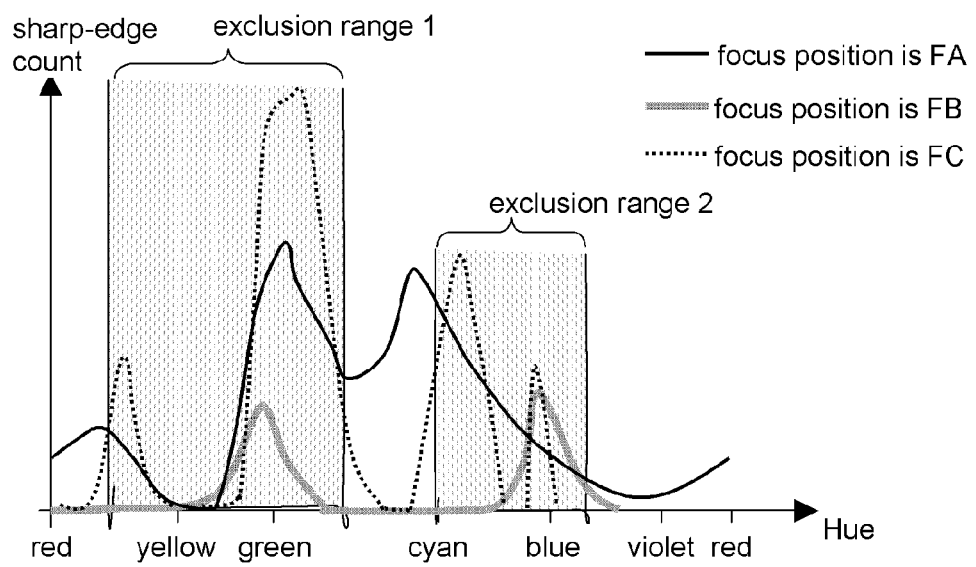
FIG. 30A is a graph showing hue exclusion ranges for focus position FA ("mountains, sun & horizon").
Figure 30B:
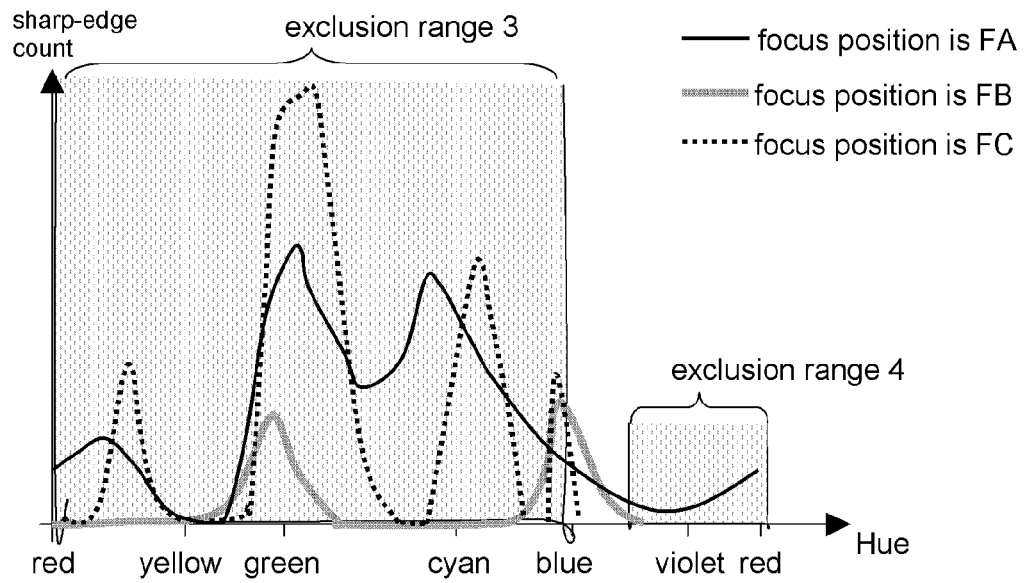
FIG. 30B is a graph showing hue exclusion ranges for focus position FB ("car").
Figure 30C:
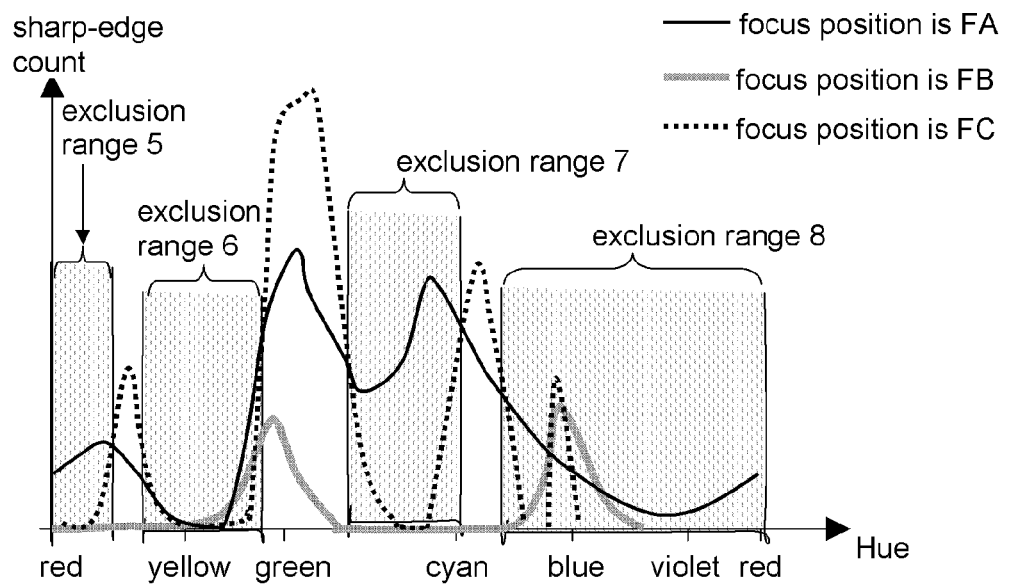
FIG. 30C is a graph showing hue exclusion ranges for focus position FC ("person").

As an illustration, FIG. 13 is a graph of narrow-edge count plotted against time when scanning the scene illustrated in FIG. 12. The narrow-edge count peaks whenever the focus position is such that an object projects a sharp image on the pixel array 108 in FIG. 1 or 2, thus its peaking signifies a presence of sharp-enough edges. FIGS. 26, 27, and 28 illustrate the images captured when the focus lens is at each of those focus positions where the narrow-edge count peaks.

FIG. 14 shows the gross focus signal output by the focus signal generator 120 during the scan, where the exclusion filter 207 is bypassed by the 'exclude' signal being OFF. The gross focus signal correctly exhibits a minimum corresponding to the times when the focus position is near each of the three focus positions that brings an object into sharp focus. However, the gross focus signal's minimum is not at the sharp_edge_width level, which is 2.0 in this example, due to the interference from blurred edges contributed by the other objects that are out-of-focus. As aforementioned, turning on 'exclude' signal after having calibrated the exclusion calibrator 205 will subsequently allow the gross focus signal to exhibit a single global minimum for each of the 3 groups of objects by retrieving exclusion ranges using the index for each group of object, even if they have moved from where they were during scanning. FIGS. 29, and 30A-30C illustrate how exclusion ranges for hue for each of those three groups of objects may be formed.

Search—Display & User Direction

Figure 31:
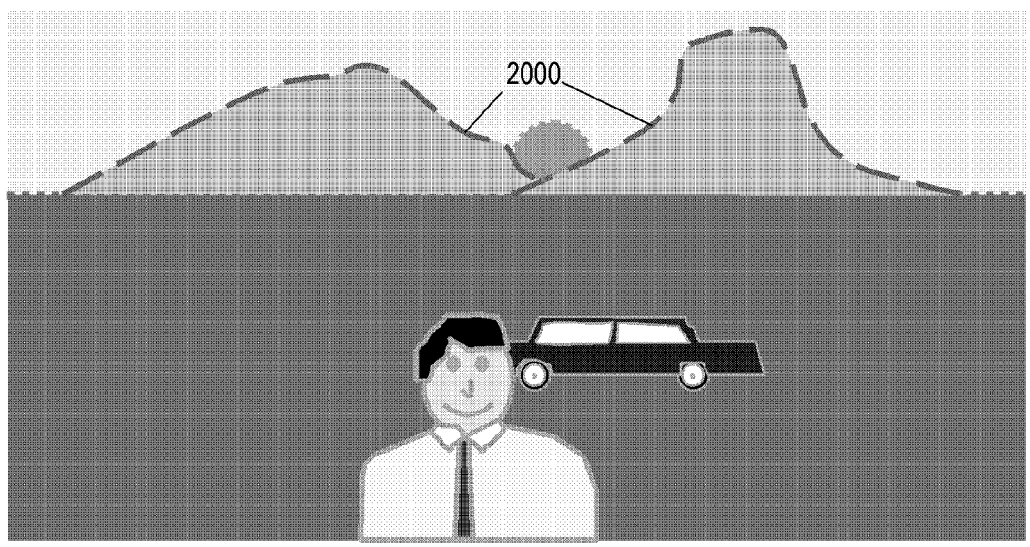
FIG. 31 is an illustration showing edges in sharp focus corresponding to the focus position FA of FIG. 13 being highlighted on a display.
Figure 32:
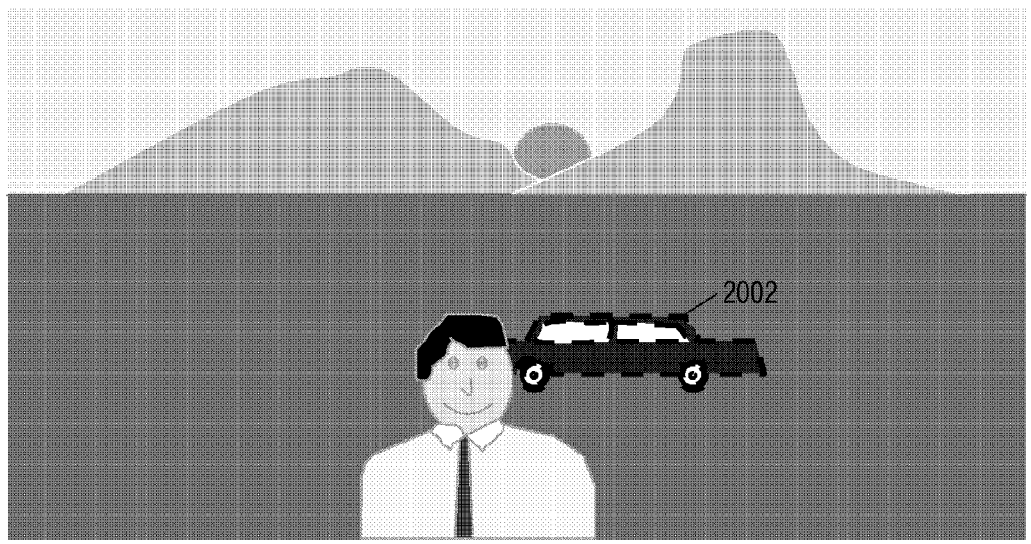
FIG. 32 is an illustration showing edges in sharp focus position FB of FIG. 14 being highlighted on a display.
Figure 33:
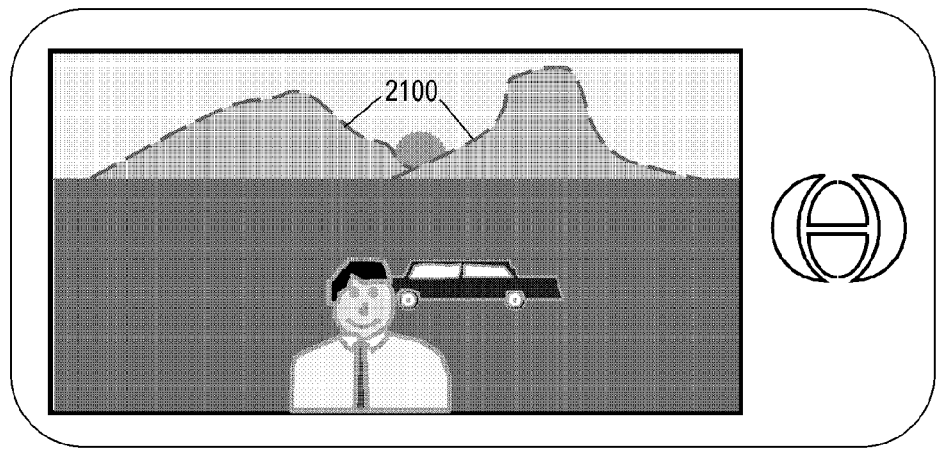
FIG. 33 is an illustration showing buttons on the image capture device for the user to request jumping to the next farther or nearer sharp focus positions.

FIG. 31-33 illustrate how edges may be highlighted on the display 114 of FIG. 1 or 2 when the focus position bring them into sharp focus. Highlighting sharp edges or sharp-enough edges is especially helpful to the user when the image capture resolution is far higher than the display resolution such that an insufficiently sharply focus edge still appears to be sharp on the display. It also solves a common problem wherein the user is not able to tell which object among several objects in the scene is in sharp focus. Having been thus informed of which objects are in sharp focus, the user can then press either the outward button 1912 of the image capture apparatus 102 of FIG. 16 to focus on a farther object, or inward button 1910 to focus on a nearer object or use any one of user input device and method available to input such user commands. The image capture apparatus 102 may also display a blinking outline 2100 overlapping the object whose edges are to be focused on, as shown in FIG. 33. In general, any display method to indicate one or more sharp-enough edges may be used, as one skilled in the art would readily recognize.

A Search Mode

Figure 34:
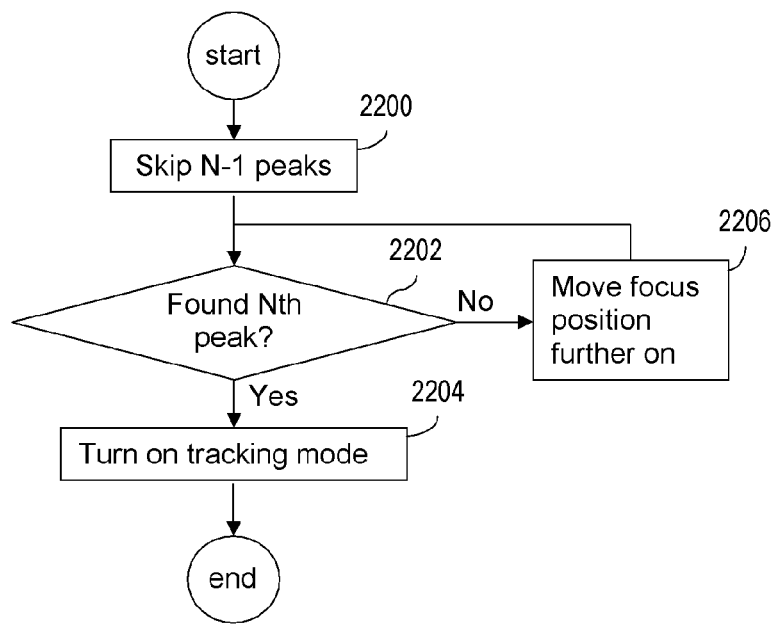
FIG. 34 is a flowchart for a focus control system in seek mode.
Figure 35:
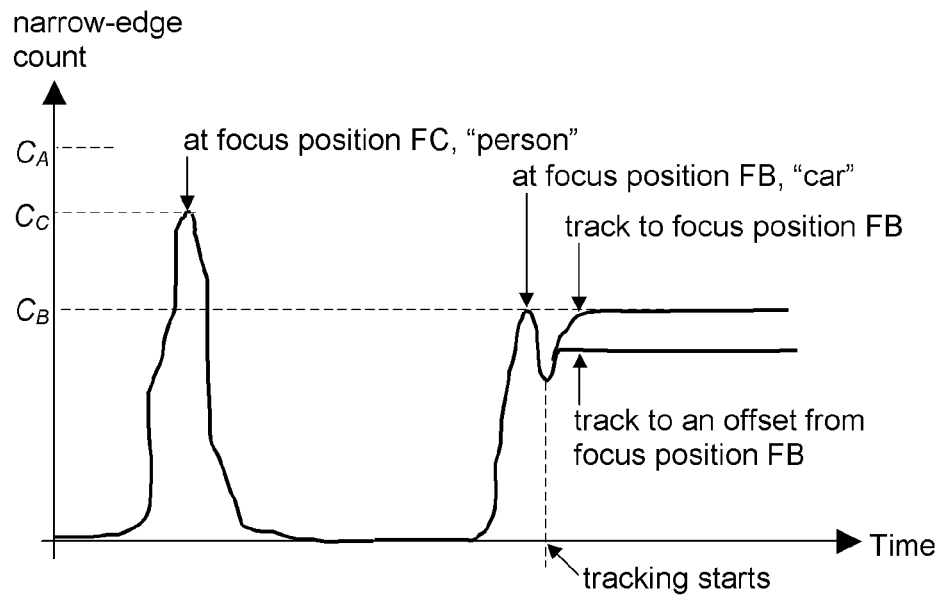
FIG. 35 is a graph of a narrow-edge count versus focus position during a seek to the focus position FB and a subsequent switch to a tracking mode.
Figure 36:
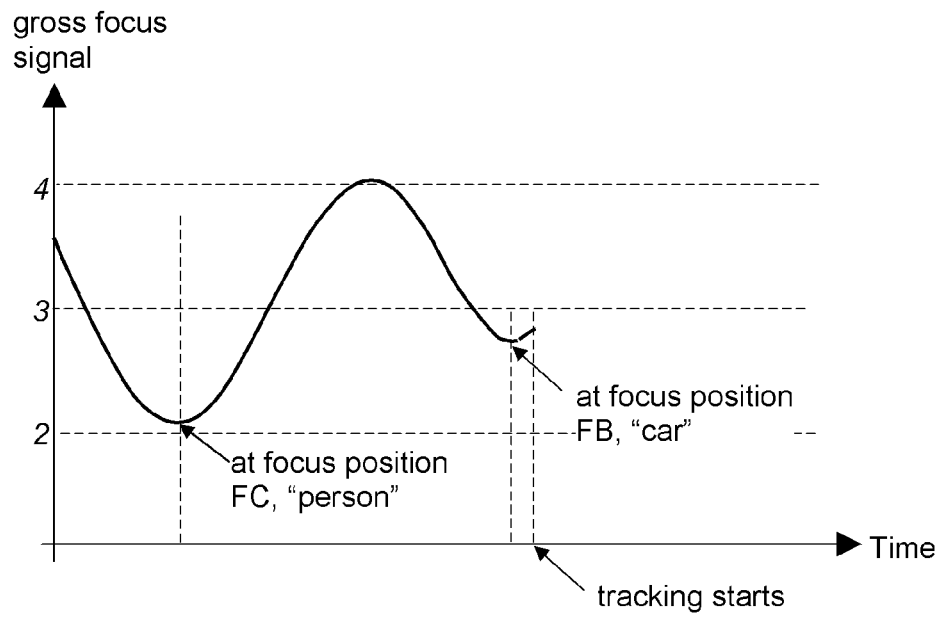
FIG. 36 is a graph showing the gross focus signal during a seek to the focus position FB corresponding to FIG. 35.

FIG. 34 is a flowchart for seeking to the Nth object in a given direction. At step 2200, the focus lens 104 moves until N−1 peaks are skipped. Peak skipping can be detected using one of several signals for peak detection ("peak-detection signal"). One candidate peak-detection signal is gross focus signal, which as FIG. 36 shows attains a local minimum at each position where there are objects producing sharp edges in the captured image. For the scene of FIG. 12, to bring the car into sharp focus, the focus lens will move outwards from the innermost position to skip focus position FC where the person is in sharp focus, past the focus position where the gross focus signal reaches a local minimum (that nearly reaches the sharp_edge_width value of 2.0). Another candidate peak-detection signal is the narrow-edge count. FIG. 35 shows narrow-edge count as focus position moves outward from the innermost position past the position where the person produces a sharp image in the captured image.

Figure 37:
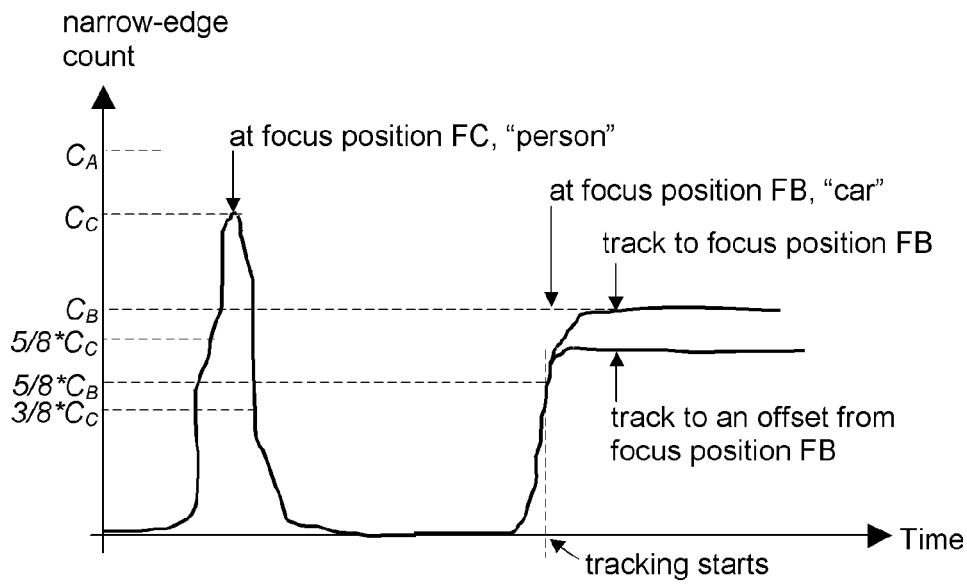
FIG. 37 is a graph of narrow-edge count versus focus position for an alternate embodiment wherein the focus system switches to tracking mode.
Figure 38:
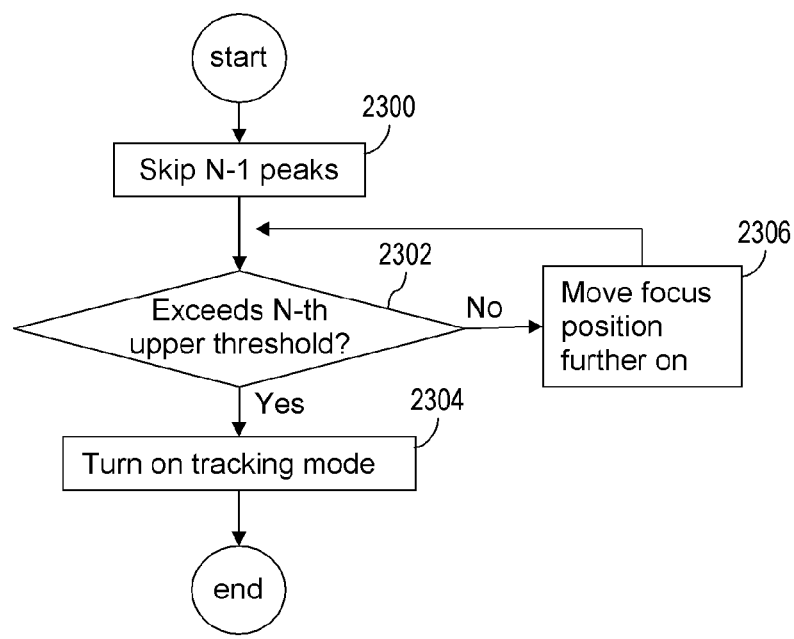
FIG. 38 is a flowchart for focus control system in seek mode for FIG. 37.

At step 2202 of the flowchart in FIG. 34, unless having found the Nth peak, continue to move focus lens in the same direction, at step 2206, and return to the same query at 2202. If found, move to step 2204 to turn on tracking mode. Detection of the Nth peak can use one of several peak-detection signals. One candidate peak-detection signal is the gross focus signal. Another candidate is the narrow-edge count. A different peak-detection signal may be used for step 2202 than step 2200. Tracking may be turned on after the peak is detected, as shown in FIGS. 35 and 36 following the flowchart of FIG. 34, or when approaching and near enough to the peak value, as shown in FIG. 37, following flowchart of FIG. 38. ("Near enough" may be exceeding a predetermined fraction of the prior detected peak value, e.g. from a prior scan.)

User Control on Search

The number N to associate with the focus position to seek to may be established in one of several ways.

In a first method, the apparatus 102 may provide a user control, such as buttons 1912 and 1910, shown in FIG. 16, or any other form of user input method/apparatus mentioned in this description, to navigate outward or inward among sharp focus positions. For example, each pressing of the button 1912 may select the next farther sharp focus position, whereas each pressing of the button 1910 may select the next nearer sharp focus position. The apparatus 102 may display a highlight such as a highlight 2000 shown in FIG. 31 on a sharp edge or a sharp object. The sharp focus positions may be memorized during a scan. The highlight 2000, or the corresponding sharp edges, or both, at each sharp focus position found during the scan may be formed and memorized in a memory, such as within the processor 112, 112', 112", during the scan. The displayed image at each sharp focus position may be memorized along. During a navigation to a target focus position, such as by using buttons 1912 and 1910 to jump farther and nearer among sharp focus positions, the highlight that corresponds to the selected sharp focus position may be retrieved from the memory and displayed on the display 1902. Along with the highlight 2000, the previously memorized displayed image that corresponds to the selected sharp focus position may be displayed as well to show what object in the memorized display image gave rise to the sharp edges at the selected sharp focus position. With this aid, the user may decide whether the selected sharp focus position corresponds to his or her intended target sharp, or he or she needs to navigate farther or nearer. Thus, even with several different objects at different focus distances giving rise to edges overlapping within the image in the display 1902 in FIG. 16, for example the head of the person and the left end of the car, the user is able to select the target object. The processor 112 thus determines the user's selection of the target sharp focus position and its associated memorized sharp focus position or exclusion chain or index or any combination thereof. If the target sharp focus position is the nearest, found from the scan, N is 1. If it is the one immediately after, N is 2; and so on. The associated chain of exclusion ranges may be retrieved and applied to the exclusion filter 207, the associated chain having been calibrated, created and stored under an index previously.

In a second method, a prior scan is not assumed. Using the user interface as described in the previous paragraph, the user may navigate farther or nearer by N number of steps. For example, the user may press button 1912 three times to demand an outward search from the current focus position past a first sharp focus position followed by a second sharp focus position to stop at a third sharp focus position. The focus system controller 112 commands the focus lens 104 to move outwards to the third sharp focus position by following the flowchart in FIG. 34, having N initialized to 3. If the user subsequently demands to change the target sharp focus position to the second sharp focus position by pressing button 1910 once, the focus system controller 112 commands the focus lens 104 to move to the second sharp focus position by following the flowchart in FIG. 34, but moving the focus position in the inward direction this time, having N initialized to 1. The apparatus 102 may display a highlight 2000 on sharp edges each time a sharp focus position is found at the final destination or in passing.

Either of the above methods is useful to deal with difficult focusing situations in which edges from objects at different focus distances overlap. One example of such situation is a chicken wire and a chicken behind the chicken wire. If the focus position has the chicken wire in sharp focus whereas the chicken is the desired object, the user can navigate outwards one step using the user interface, for example by pressing the outward button 1912 once. In response, the focus system controller 112 commands the focus lens 104 to move outwards until the next sharp focus is detected, which is the sharp focus position for the chicken. On the other hand, if the focus position has the chicken in sharp focus whereas the chicken wire is the desired object, the user can navigate inwards one step using the user interface, for example by pressing the inward button 1910 once. In response, the focus system controller 112 commands the focus lens 104 to move inwards until the next sharp focus is detected, which is the sharp focus position for the chicken wire. In either case, the sharp object or its edges may be highlighted on the display 1902 each time an object is brought into sharp focus to help the user determine which object is in sharp focus.

Highlighting on a display an object or its edges in sharp focus, providing a user interface that accepts a user's command to initiate and/or request a direction to seek to a next focus position to bring a farther or nearer object into sharp focus, seeking to said next sharp focus position upon a user entering a corresponding command via said user interface, and highlighting objects or their edges brought into sharp focus during transiting to the final focus position are steps useful to a user of an apparatus 102 regardless of how the focus signal is formed or how the object or its edges in sharp focus is determined. The focus signal may be generated by measuring widths of edges in an image as in this application. Alternately, the apparatus 102 may measure a contrast across an edge and detecting sharp focus of the edge by detecting a peaking in said contrast when focus position of the focus lens 104 is changed. Alternately, the apparatus 102 may generate a focus signal by dividing the image into groups of adjacent pixels, e.g. each group having 16-by-16 pixels, a contrast measured within each group as a difference between a maximum value and a minimum value of a signal that represents visible light reflecting from the scene, e.g. luminance, and detecting sharp focus within said group of pixels by detecting a peaking in said contrast when focus position of the focus lens 104 is changed, and highlighting a portion of the image displayed in display 1902 corresponding to said group of pixels. Alternately, the apparatus 102 may generate a focus signal using any conventional method.

A Tracking Mode

The focus system controller, such as processor 112 in FIG. 1 or 2, may turn on the 'fine' control signal to the focus signal generator 120 to receive a fine focus signal when tracking mode starts. It may also turn on the 'exclude' control signal and provide the corresponding index to an exclusion calibration 205 within the focus signal generator 120 to retrieve the corresponding exclusion ranges, if the object nearly in-focus has been previously calibrated. If not, it can issue a calibrate command to the exclusion calibration 205 to perform a calibration and provide a new index to store the calibrated exclusion ranges, and subsequently retrieve them for use by the exclusion filter 207. Doing so improves an accuracy of the fine focus signal by greatly attenuating the interference from unintended objects.

Figure 39:
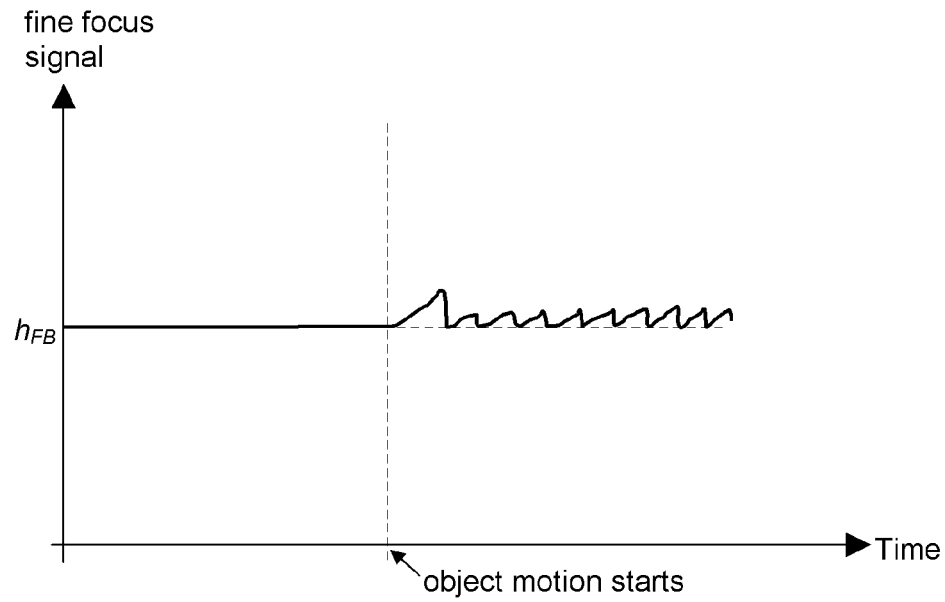
FIG. 39 is a graph illustrating a variation of the fine focus signal during tracking of a moving object for an embodiment of a focus control system that maintains the fine focus signal at a minimum.
Figure 40:
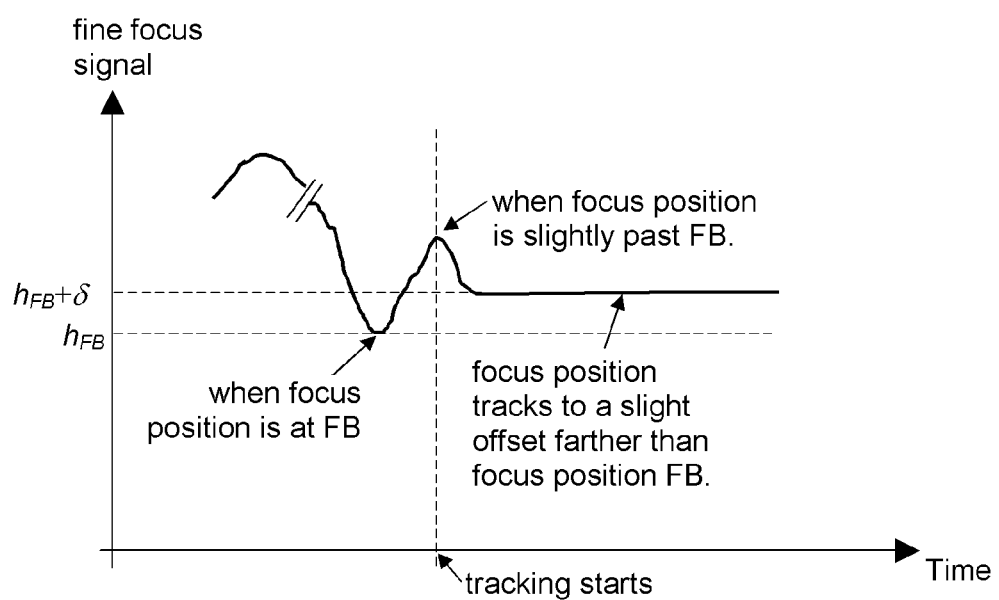
FIG. 40 is a graph illustrating how a fine focus signal varies with time during a sharp focus acquisition.
Figure 41:
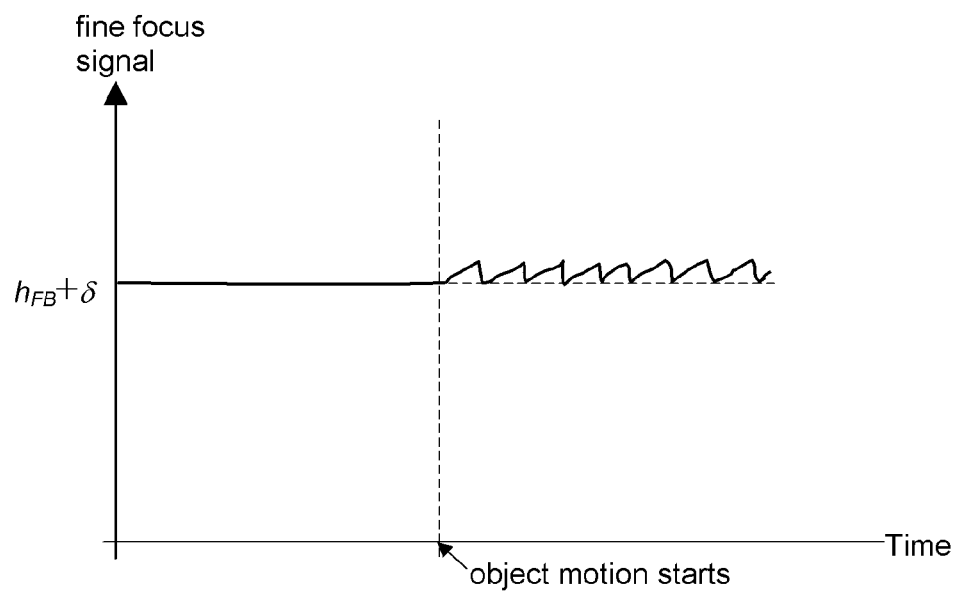
FIG. 41 is a graph illustrating a variation of the fine focus signal during a tracking of a moving object for an alternate embodiment of focus control system that maintains the fine focus signal at an offset from a minimum.

The focus system controller may adjust the focus position to keep the fine focus signal nearest possible to the minimum, as shown in FIG. 39, or it can pursue an alternate strategy of controlling the focus position to keep the fine focus signal an offset away from the sharp_edge_width and above the minimum, as shown in FIGS. 40 and 41. (sharp_edge_width is labeled as $h_{FB}$ in FIGS. 40-41.) Maintaining fine focus signal at an offset above sharp_edge_width and the minimum has a benefit in that a slight change in the fine focus signal due to any movement in the object gives off clue as to whether the object is moving closer or farther. If the focus position is farther than the ideal focus position that would have brought the fine focus signal to the minimum (hence the fine focus signal level is higher than the minimum), a movement in the object that reduces the fine focus signal must be directed outwards, i.e. closer to the scene location where the current focus position would make sharp image. On the other hand, if a movement in the object increases the fine focus signal, the object must be moving inwards, i.e. away from that scene location. On the other hand, if the focus position is nearer than the ideal focus position, the opposite would be true. The focus system controller then can immediately move the focus lens in the direction thus determined. This is shown in FIG. 41 where the fine focus signal is shown to always return to the same level after a small departure, whereas in FIG. 39 where the focus system controller targets the fine focus signal to the minimum is unable to immediately determine the direction of movement of the object and may make a mistake when the object starts moving, causing the initial increase in fine focus signal to be more rapid, and only after that to realize the mistaken guess of direction and to correct itself. In FIG. 39, the subsequent ripples are maintained as small as FIG. 41 on the assumption that the object continues to move in the same direction, hence the focus system controller does not make a second mistake in the direction. But if the object changes direction, the focus system controller that targets the minimum focus signal level can make a mistake again.

In general, in this alternative strategy, the focus system controller should servo a focus signal to a target level offset from a optimal signal level (of the focus signal) that indicates a sharpest focusing of a plurality of edges whose edge widths contribute towards the focus signal, the target level indicating a less focused state of the plurality of edges than the optimal signal level. This is due to the observation that the effects on the focus signal would be indistinguishable between a forward displacement and a backward displacement of the focus lens, that both would result in the edges becoming wider, if the focus lens were positioned at the sharpest focus position for these edges.

Use with Exclusion Illustrated

Figure 44:
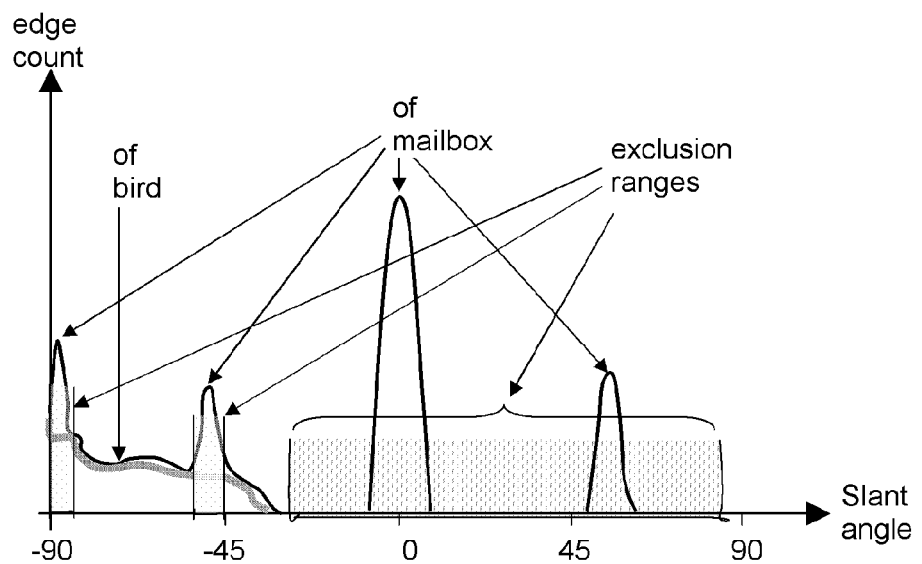
FIG. 44 is a first histogram of slant angle from the vertical axis of edges and a second histogram of only sharp-enough edges (bird) of FIG. 42A.

FIGS. 42A-42C illustrate an ability of the focus control system to track an object (the bird) that moves relative to background objects. In FIG. 42A, the bird is in sharp focus, and the focus system controller issues a calibrate command to the exclusion calibrator 205 and turns the 'fine' control signal ON to generate a fine focus signal and the 'exclude' control signal ON to exclude the mailbox, which is not sharp in FIG. 42A. The exclusion calibrator 205 finds two characteristics, namely the length of concatenated edges and slant angles, whose exclusion ranges are shown in FIGS. 43 and 44, respectively, to exclude the mailbox from the bird.

Next, in FIG. 42B, the bird flies near and rests on the mailbox. Between FIGS. 42A and 42B, the focus control system continues to track the bird to keep it in sharp focus. When the bird comes to rest on the mailbox, edges contributed by the mailbox are also sharp-enough edges, but they are excluded by the exclusion filter 207 by using two characteristics, namely the length of concatenated edges and slant angles, whose exclusion ranges are shown in FIGS. 43 and 44, respectively. The fine focus signal continues to indicate the sharpness of edges contributed by only the bird, not the mailbox. Finally, when the bird flies away, the focus control system continues to track the bird to maintain its image in sharp focus and not getting falsely-locked onto the mailbox, which by the sheer larger number of edges would have otherwise dominated the fine focus signal and falsely tell the focus control signal that the object of interest remains at the same focus distance.

Certain Advantages

One advantage of the focus signal generator is that the minimum focus signal of different images are at approximately the same values. This ensures that the lens will remain in the same position even if the camera is shaking but the image still remains sharp. Another advantage is that the range between the largest and smallest focus signal for a scene with different focal distances are wide enough to ensure that the optimum focus can be obtained.

A further advantage is that the focus signal value is not dependent on illumination nor on color or reflectivity of objects in the scene. Conventional contrast method of generating a focus signal produces contrast signal which is strongly dependent on all said factors, such that when a new object enters the scene even though at the sharp focus distance, the focus signal produced by the contrast method usually changes.

Alternate Embodiments

Figure 45:
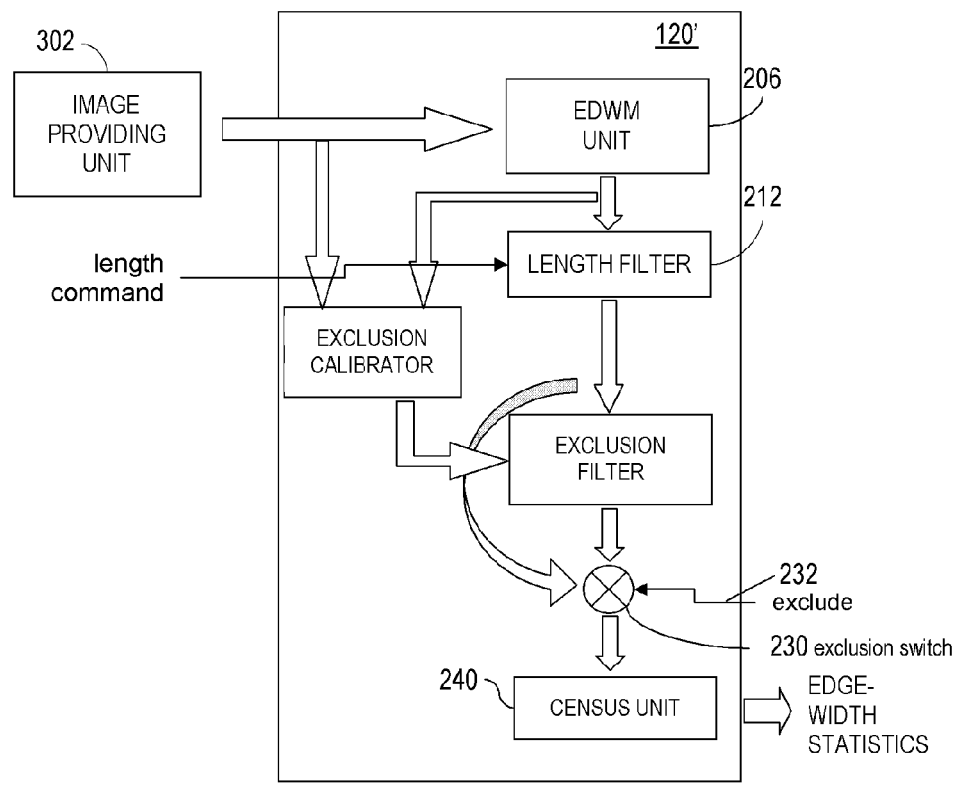
FIG. 45 is a block diagram of an alternate embodiment of a focus signal generator.

FIG. 45 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 46:
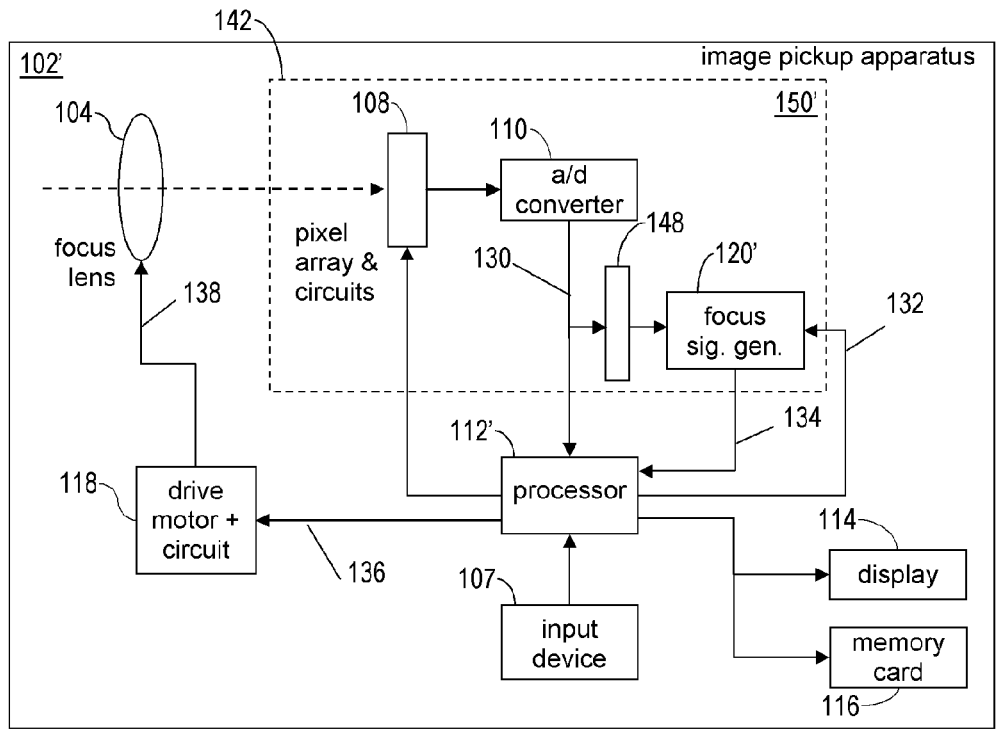
FIG. 46 is a schematic of an alternate embodiment of an auto-focus image pickup apparatus.

Referring to FIG. 46, the edge-width statistics thus provided in signals 134 to an alternate embodiment of processor 112' in an alternate auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134. For example, the exclusion ranges and chains, along with statistics of edges, such as statistics of edge characteristics used for calculating the exclusion ranges and chains according to the flowcharts of FIG. 19 or FIG. 20, may be sent to the processor 112'.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Yet another embodiment of a focus signal generator may add a census unit 240 to the generator 102 of FIG. 1 and output one or more statistics calculated in such a generator to the processor 112.

Auxiliary Pixel Array

Figure 47:
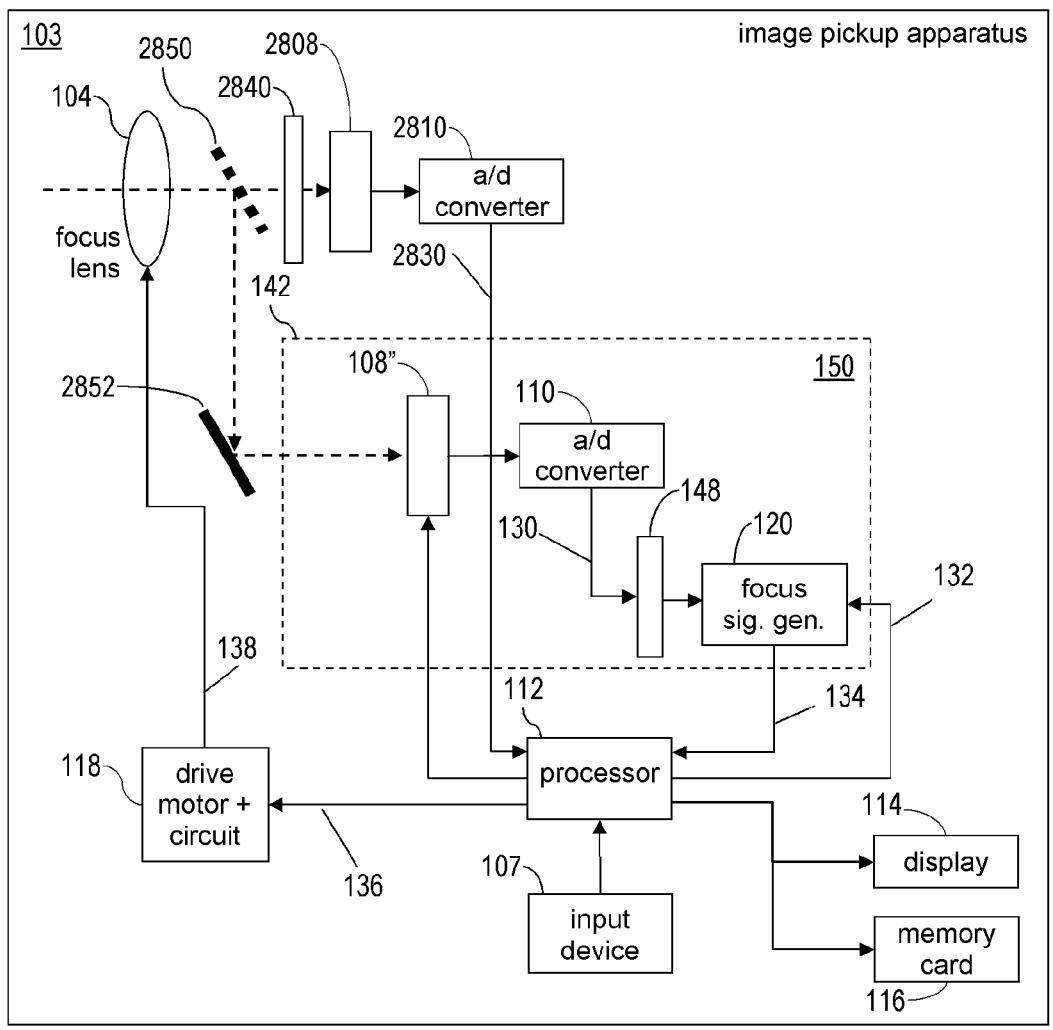
FIG. 47 is a schematic of an embodiment of an auto-focus image pickup apparatus having a main pixel array and an auxiliary pixel array.

FIG. 47 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. Upon splitting at the partial mirror 2850, the ratio of light intensity (in unit of Joule per second) of the first beam to the second beam may be greater than 1-to-1, preferably greater than 2-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 50:
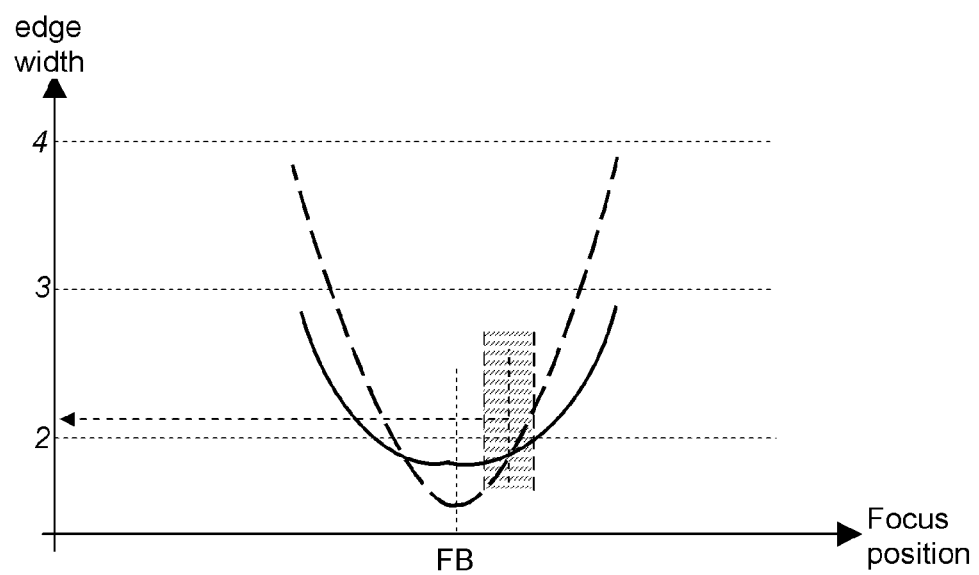
FIG. 50 is a illustration of a variation of an edge width from a main pixel array and a variation of an edge width from an auxiliary pixel array at different focus positions.

FIG. 50 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 50 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images. This is in accordance with the alternate strategy described in the above section on Tracking Mode, where the focus system controller should servo a focus signal to a target level offset from a optimal signal level (of the focus signal) that indicates a sharpest focusing of a plurality of edges whose edge widths contribute towards the focus signal, the target level indicating a less focused state of the plurality of edges than the optimal signal level. With reference to FIG. 50, the focus control system servoes the edge width from the auxiliary array to a width somewhat larger than the smallest possible edge width achievable on the auxiliary array.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 48:
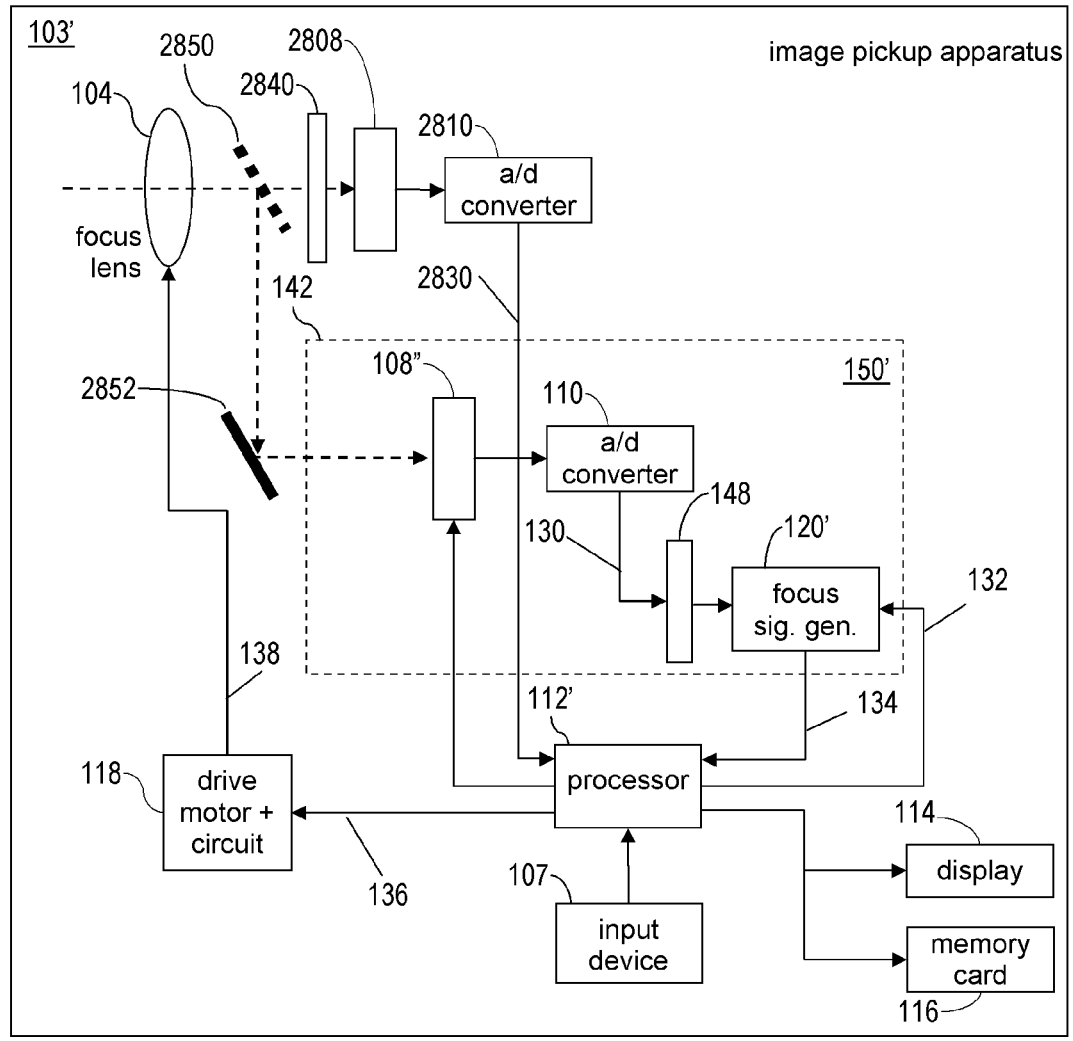
FIG. 48 is a schematic of an alternate embodiment of an auto-focus image pickup apparatus having a main pixel array and an auxiliary pixel array.

FIG. 48 shows an alternate embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 49:
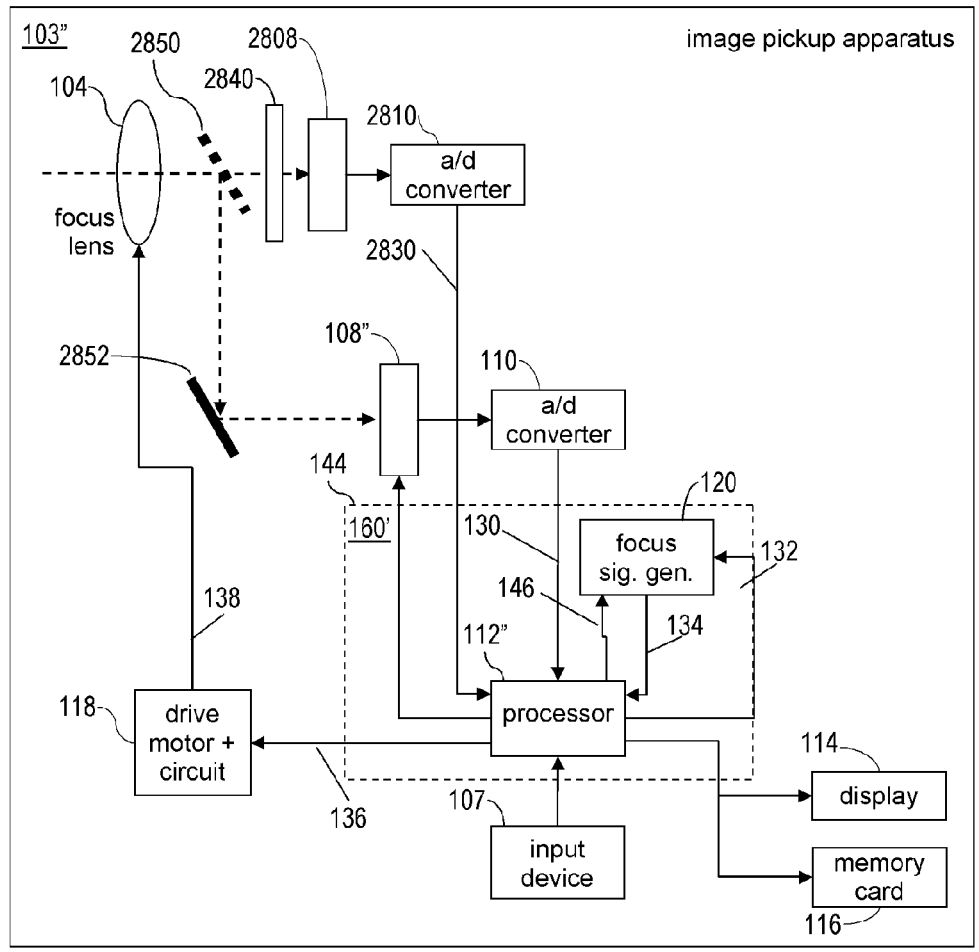
FIG. 49 is a schematic of an alternate embodiment of an auto-focus image pickup apparatus having a main pixel array and an auxiliary pixel array.

FIG. 49 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An image pickup apparatus, comprising:
a focus lens;
a pixel array that receives light from the focus lens; and
a focus signal generator,
wherein the focus signal generator generates a focus signal from a plurality of widths, each width being from a different one of a plurality of edges in an image, the image having been captured by the pixel array,
wherein a width of an edge is corrected to a reduced width along a second direction, the width being along a first prescribed direction.

2. The image pickup apparatus of claim 1, wherein the reduced width is calculated from the width using a first maximal gradient and a second maximal gradient, the first maximal gradient being a peak gradient of the edge and in the first prescribed direction, the second maximal gradient being a largest gradient within a predefined distance from the peak gradient and in a second prescribed direction that is perpendicular to the first prescribed direction.

3. The image pickup apparatus of claim 2, wherein the predefined distance is two pixels.

4. The image pickup apparatus of claim 1, wherein the reduced width is a projection of the width from the first prescribed direction to the second direction.

5. The image pickup apparatus of claim 1, wherein a ratio of the reduced width to the width is a function of a pair of mutually perpendicular gradients.

6. A method for generating a signal to indicate sharpness of image from a plurality of widths each associated with a different one of a plurality of edges in an image, comprising:
   correcting by a processor a width of an edge to a reduced width along a second direction, the width being along a first prescribed direction; and
   generating the signal from at least the reduced width.

7. The method of claim 6, wherein the reduced width is calculated from a first maximal gradient and a second maximal gradient, the first maximal gradient being a peak gradient of the edge and in the first prescribed direction, the second maximal gradient being a largest gradient within a predefined distance from the peak gradient and in a second prescribed direction, the second prescribed direction being perpendicular to the first prescribed direction.

8. The method of claim 7, wherein the predefined distance is two pixels.

9. The method of claim 6, wherein the reduced width is a projection of the width from the first prescribed direction to the second direction.

10. The method of claim 6, further comprising:
    moving a focus lens in response to the focus signal.

11. The method of claim 7, further comprising:
    moving a focus lens in response to the focus signal.

12. The method of claim 8, further comprising:
    moving a focus lens in response to the focus signal.

13. The method of claim 9, further comprising:
    moving a focus lens in response to the focus signal.

14. The method of claim 6, wherein a ratio of the reduced width to the width is a function of a pair of mutually perpendicular gradients.

* * * * *